(12) United States Patent
Uchino

(10) Patent No.: US 7,415,612 B2
(45) Date of Patent: Aug. 19, 2008

(54) IMAGE ENCRYPTING METHOD, AND IMAGE DECRYPTING METHOD

(75) Inventor: Fumiko Uchino, Otokuni-Gun (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 778 days.

(21) Appl. No.: 10/426,695

(22) Filed: May 1, 2003

(65) Prior Publication Data

US 2003/0206633 A1 Nov. 6, 2003

(30) Foreign Application Priority Data

May 1, 2002 (JP) .......................... P2002-129993

(51) Int. Cl.
- H04L 9/00 (2006.01)
- H04N 1/44 (2006.01)
- G06K 9/00 (2006.01)

(52) U.S. Cl. ................ 713/176; 713/177; 713/178; 713/179; 713/180; 713/181; 380/246; 382/162; 382/163; 382/164; 382/165

(58) Field of Classification Search ............... 713/176
See application file for complete search history.

(56) References Cited

U.S. PATENT DOCUMENTS

| | | | |
|---|---|---|---|
| 5,809,160 A * | 9/1998 | Powell et al. ............... 382/100 |
| 6,549,653 B1 * | 4/2003 | Osawa et al. ............... 382/162 |
| 6,901,514 B1 * | 5/2005 | Iu et al. ...................... 713/176 |
| 2005/0185820 A1 * | 8/2005 | Yoshida et al. .............. 382/100 |

FOREIGN PATENT DOCUMENTS

| | | |
|---|---|---|
| JP | 7-222015 | 8/1995 |
| JP | 8-023442 | 1/1996 |
| JP | 9-130620 | 5/1997 |
| JP | 9-181929 | 7/1997 |
| JP | 10-191017 | 7/1998 |
| JP | 2001-103291 | 4/2001 |

OTHER PUBLICATIONS

U.S. Appl. No. 09/593,458, filed Jun. 14, 2000.
IEICE technical report, vol. 92, No. 355, Dec. 7, 1992, pp. 19-28. (W/English Summary).

* cited by examiner

Primary Examiner—Longbit Chai
(74) Attorney, Agent, or Firm—Buchanan Ingersoll & Rooney PC

(57) ABSTRACT

An image decrypting apparatus derives spectral reflectance of the face of an original on the basis of obtained original image data, built-in light source data and basis function data, and obtains weighted coefficients of each pixel as object color component data. The apparatus stores a file including the basis function data used at the time of obtaining the spectral reflectance as a key file, and stores a file including the object color component data as an encrypted file. From each of the key file and the encrypted file, the original image data cannot be reproduced. By using the key file and the encrypted file in a correct combination, the original image data can be reproduced. In such a manner, the original image data can be protected.

23 Claims, 22 Drawing Sheets

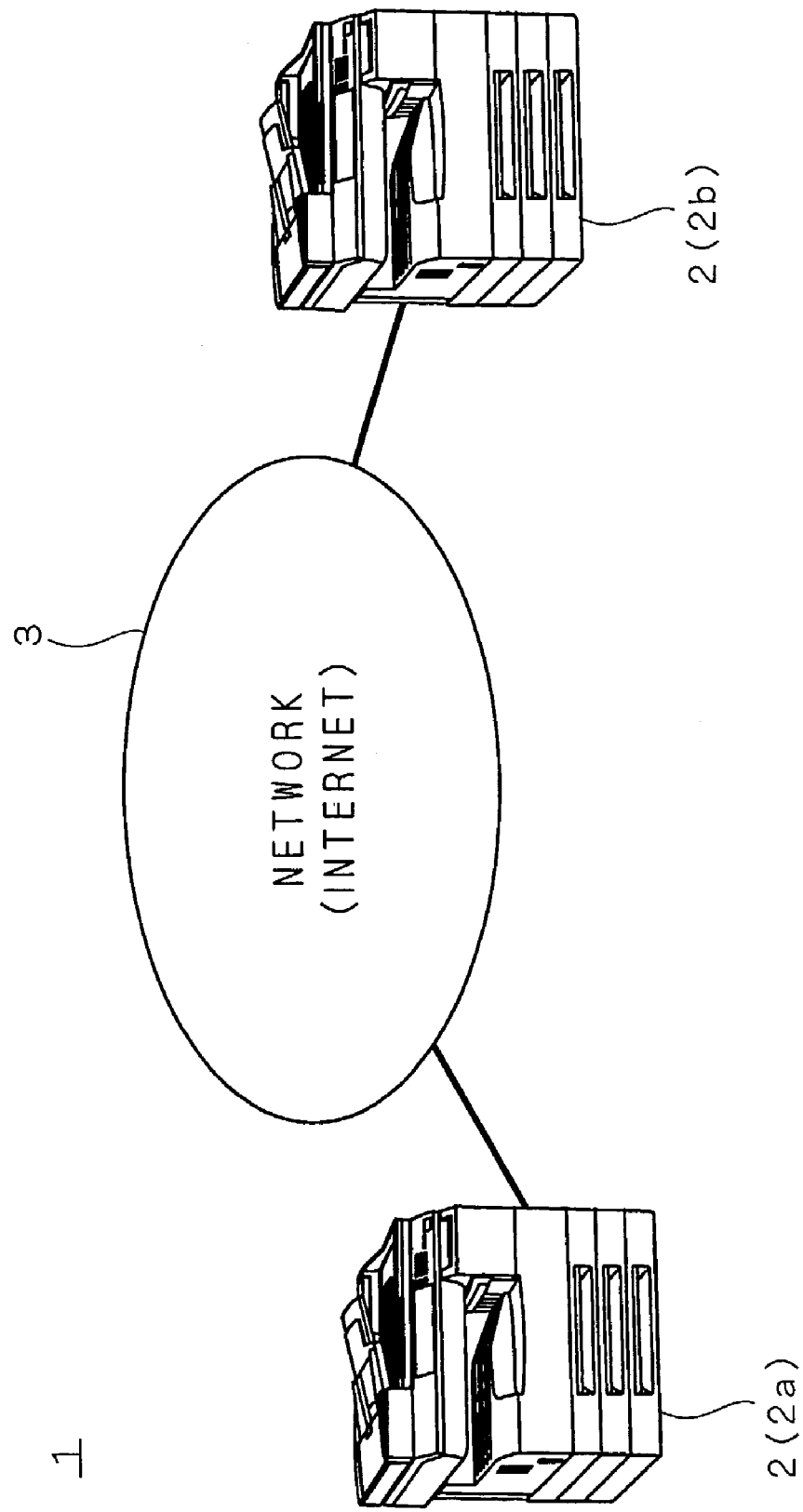

F I G. 9
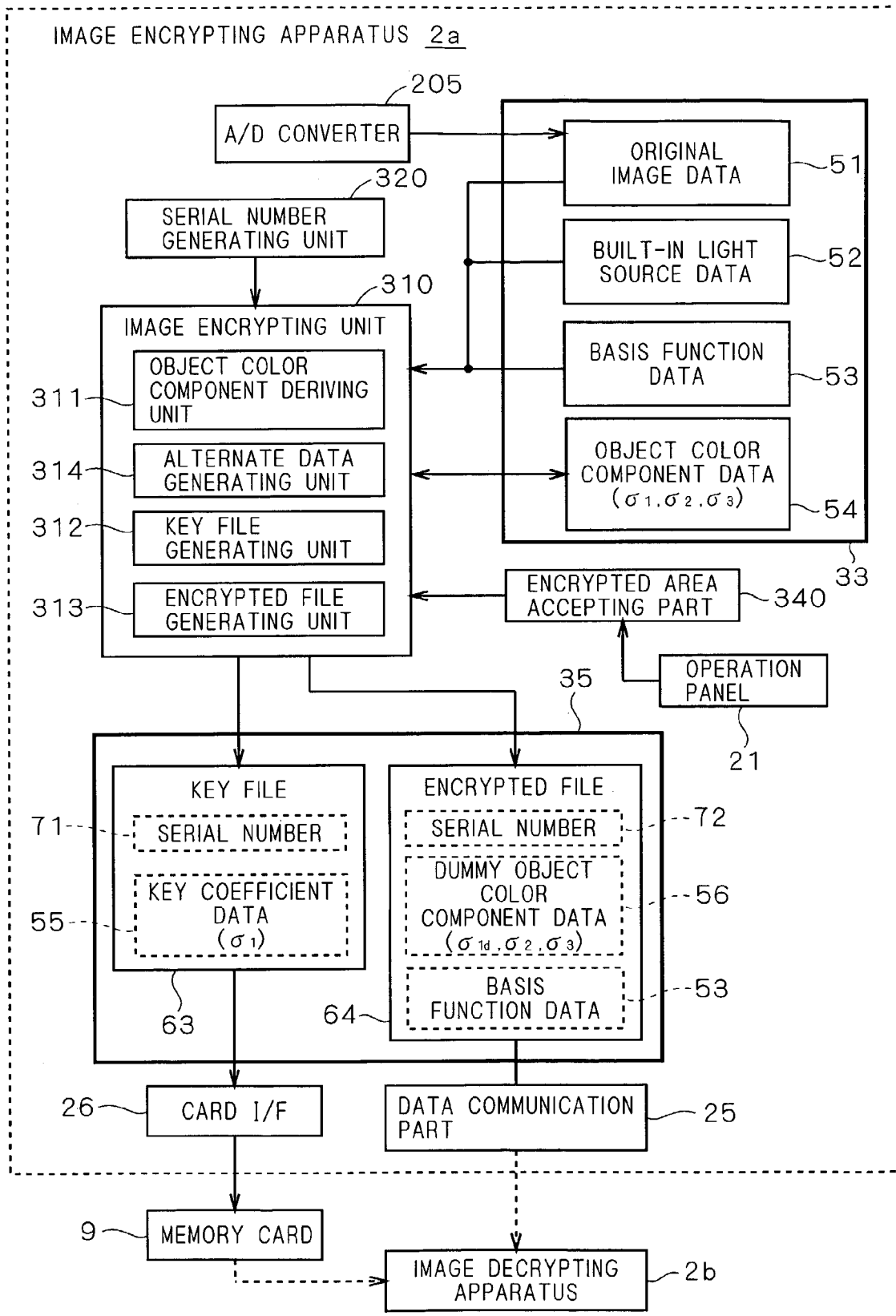

F I G . 1 1
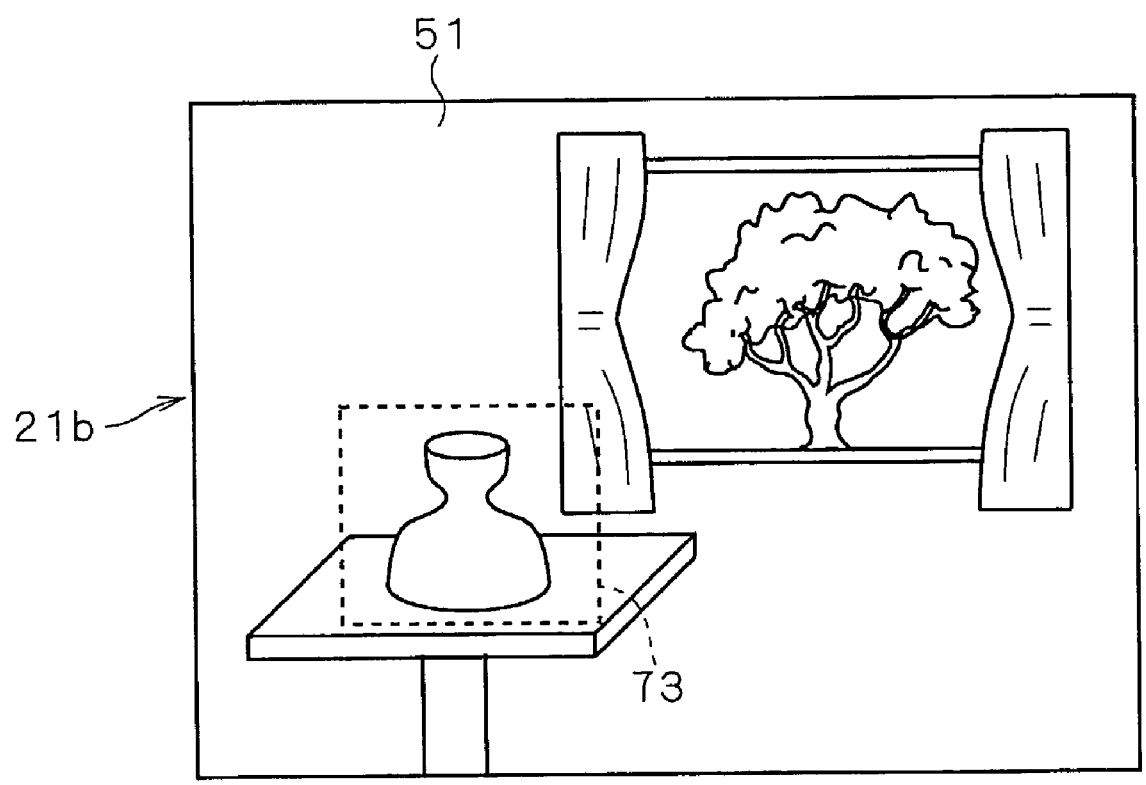

F I G . 1 6
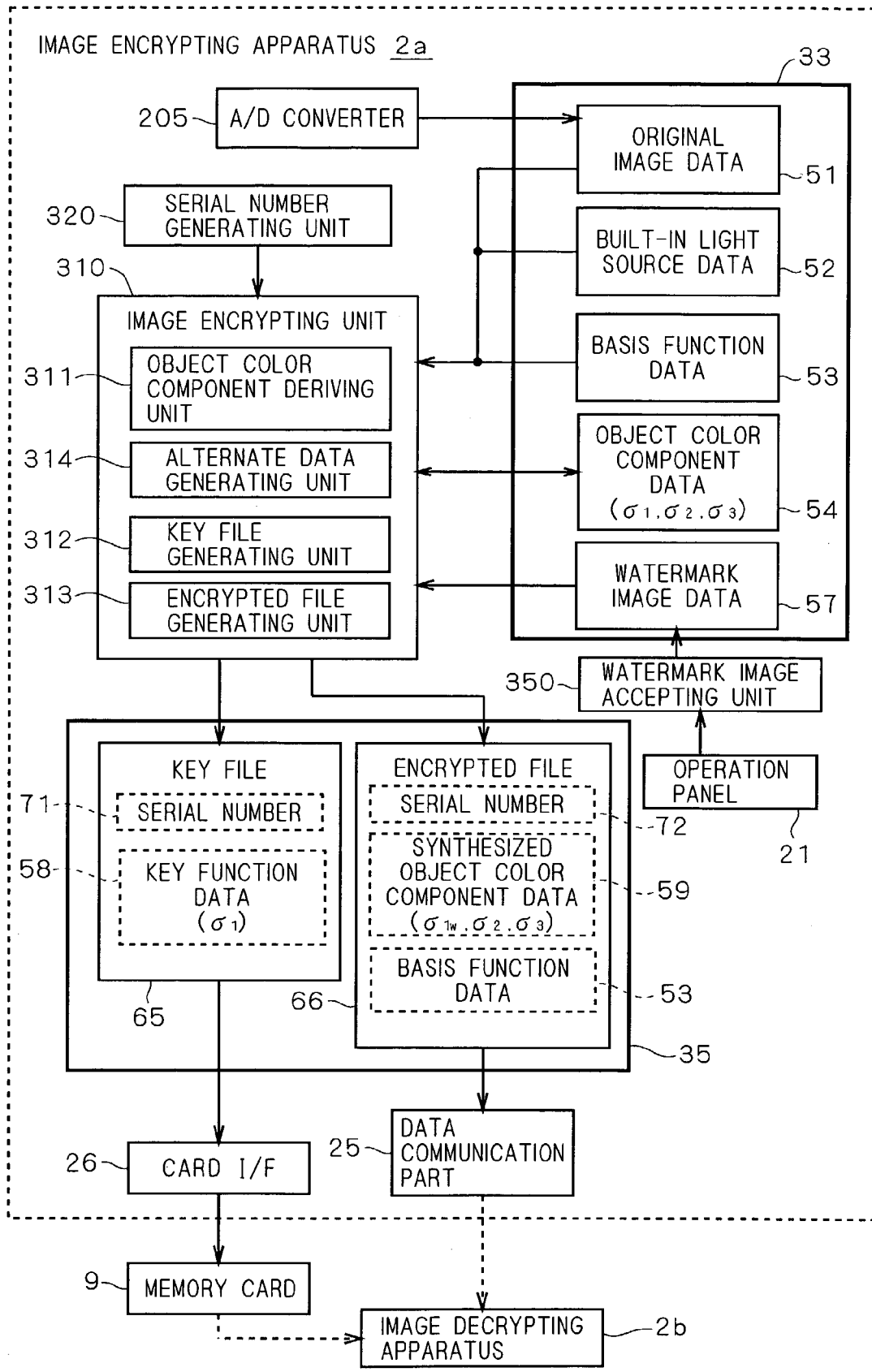

F I G . 1 7
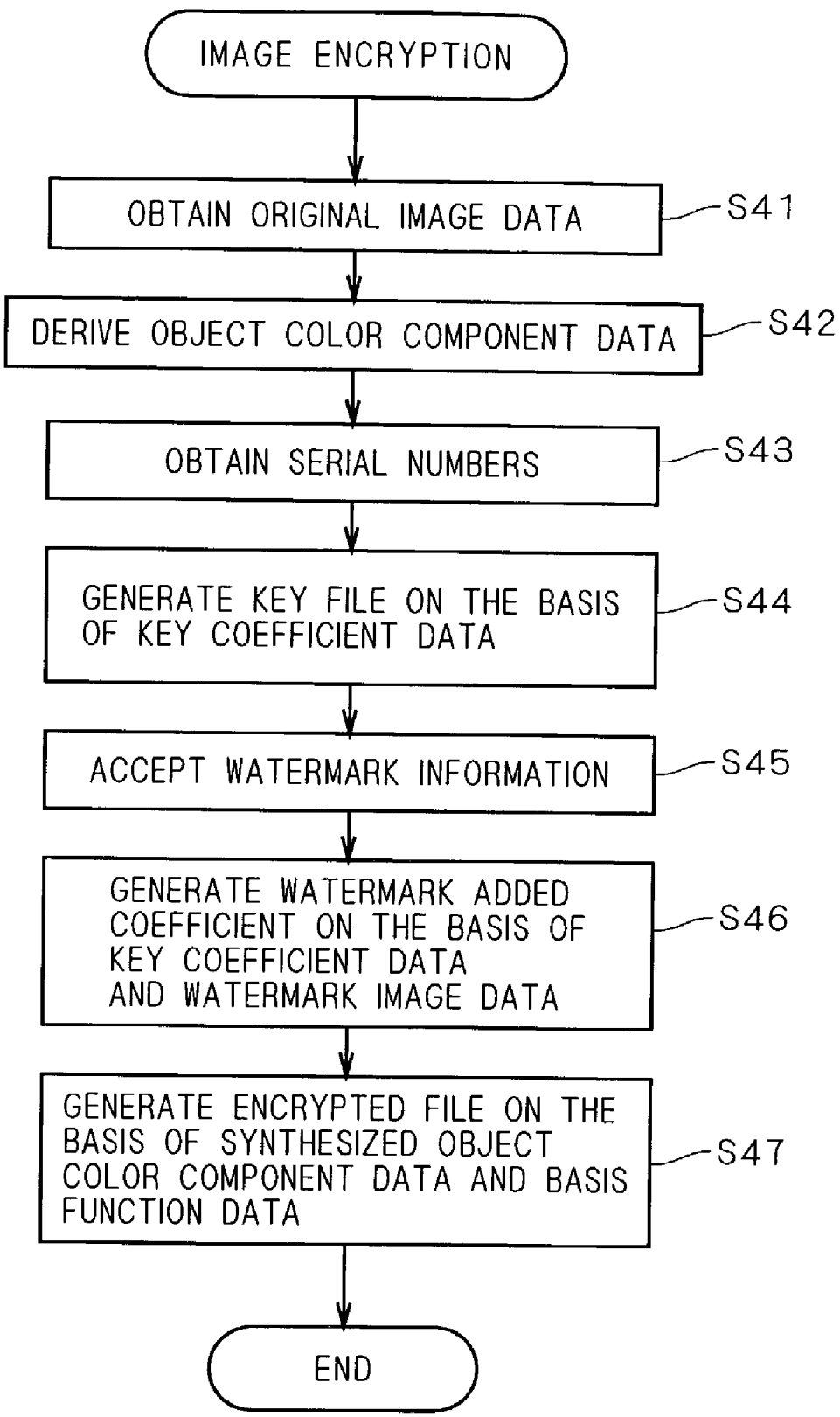

F I G . 1 8

57

83

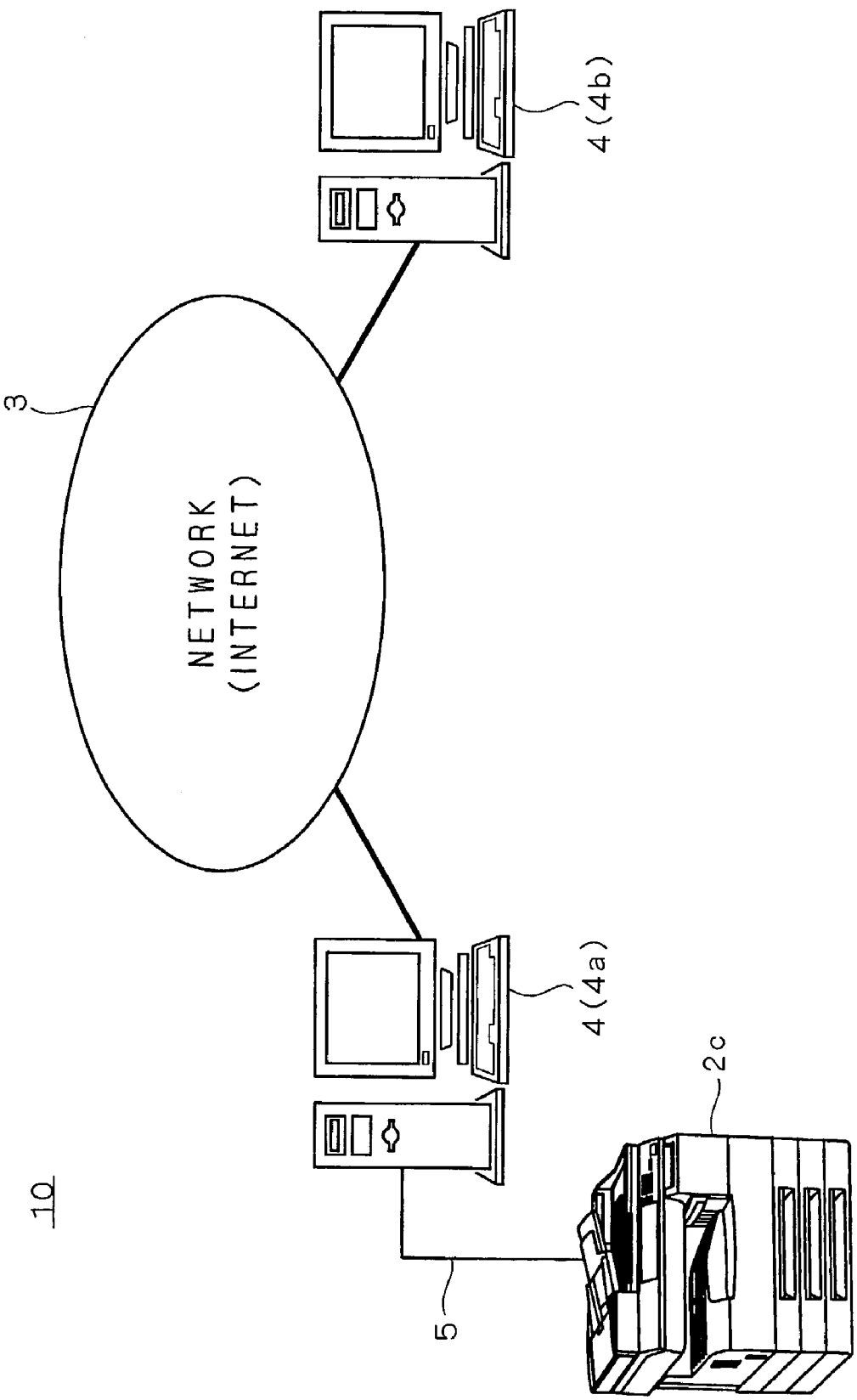

IMAGE ENCRYPTING METHOD, AND IMAGE DECRYPTING METHOD

This application is based on application No. 2002-129993 filed in Japan, the contents of which are hereby incorporated by reference.

BACKGROUND OF THE INVENTION

1. Field of the Invention

The present invention relates to a technique of encrypting image data.

2. Description of the Background Art

In recent years, as data communication technologies using a network develop, transmission of information with image data is more frequently performed. On the other hand, assurance of security of information in data communication using a network is regarded as important.

Consequently, a technique of protecting image data is demanded so that the image data is not leaked to an indefinite number of people.

SUMMARY OF THE INVENTION

The present invention is directed to an image encrypting method of encrypting image data.

According to the present invention, the image encrypting method comprises the steps of: deriving a plurality of weighted coefficients from image data to express the image data by a predetermined basis function and the plurality of weighted coefficients; setting a part of the basis function and the plurality of weighted coefficients as key data and generating a first file including the key data; and generating a second file including data of the basis function and the plurality of weighted coefficients except the key data.

With the method, the image data can be protected.

According to an aspect of the present invention, the key data is a key coefficient as one of the plurality of weighted coefficients, and the second file includes alternate data of the key coefficient, which is different from a value of the key coefficient.

Since the alternate data is included in the second file and accurate image data cannot be reproduced only by the second file, the image data can be properly protected.

According to another aspect of the present invention, the image encrypting method further comprises the step of accepting information to be provided as a digital watermark in an image, wherein the alternate data is generated on the basis of the key coefficient and the information.

Thus, the information can be protected.

The present invention is also directed to an image decrypting method of decrypting image data.

According to the present invention, an image decrypting method comprises the steps of: obtaining key data from a first file including the key data as a part of a predetermined basis function and a plurality of weighted coefficients for expressing image data; obtaining data from a second file including data of the basis function and the plurality of weighted coefficients except the key data; and reproducing the image data on the basis of the key data obtained from the first file and the data obtained from the second file.

Consequently, the protected image data can be viewed.

The present invention is also directed to a computer program product.

The present invention is also directed to an image encrypting apparatus.

The present invention is also directed to an image decrypting apparatus.

Therefore, an object of the present invention is to provide a technique capable of protecting image data.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing a schematic configuration of a network system applied to a preferred embodiment of the present invention;

FIG. 9 is a block diagram showing a functional configuration of an image encrypting apparatus according to a second preferred embodiment;

FIG. 11 is a diagram showing an example of original image data;

FIG. 16 is a block diagram showing a functional configuration of an image encrypting apparatus according to a third preferred embodiment;

FIG. 17 is a diagram showing the flow of the image encrypting process of the image encrypting apparatus according to the third preferred embodiment;

FIG. 18 is a diagram showing an example of watermark image data;

FIG. 22 is a diagram showing a schematic configuration of a network system of a fourth preferred embodiment.

DESCRIPTION OF THE PREFERRED EMBODIMENTS

Hereinafter, preferred embodiments of the present invention will be described with reference to the drawings.

1. First Preferred Embodiment 1-1. System Configuration

Figure 1:
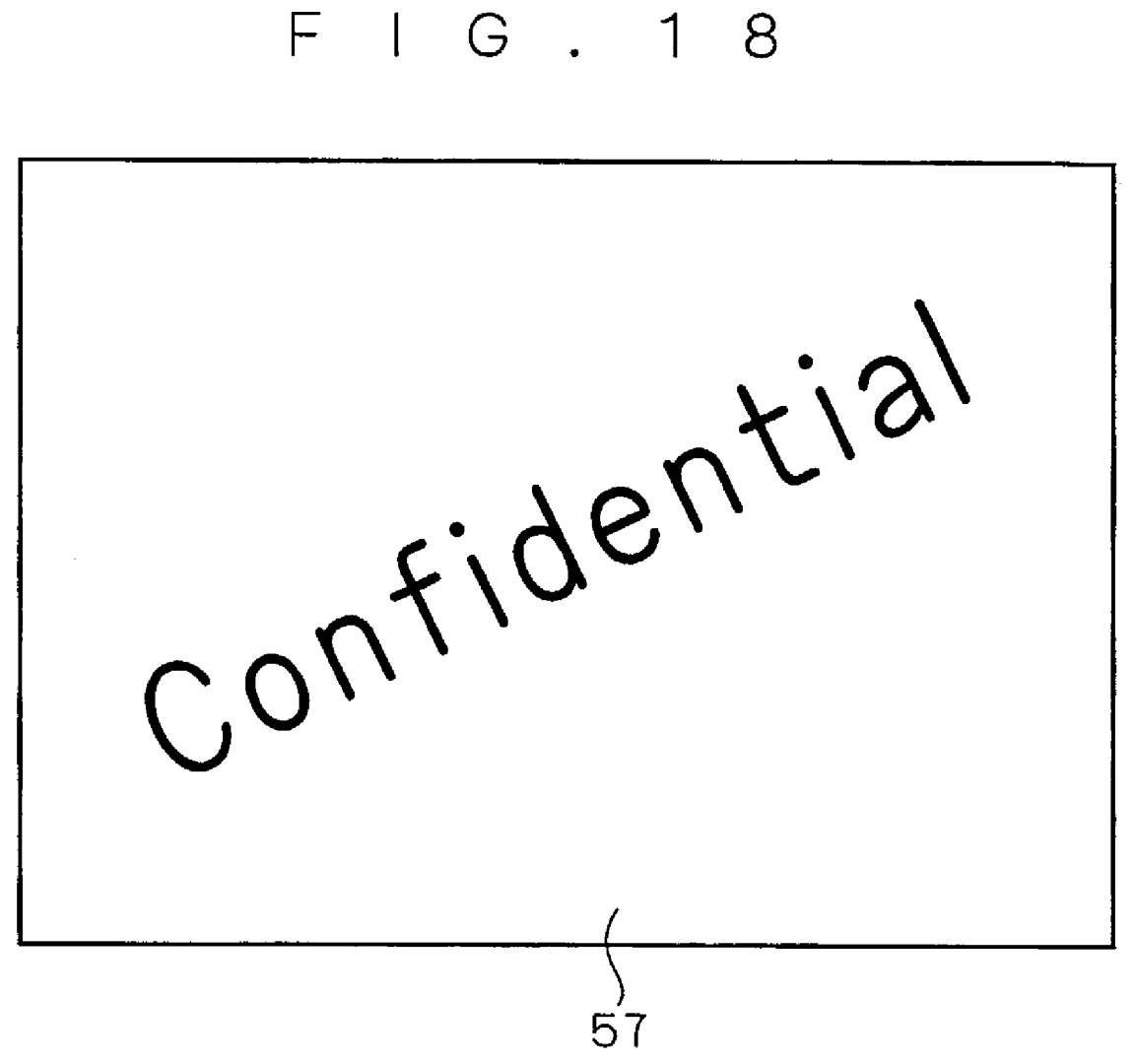

FIG. 1 is a diagram showing a schematic configuration of a network system 1 applied to a preferred embodiment of the present invention. As shown in FIG. 1, the network system 1 is constructed in such a manner that a plurality of MFPs (Multi Function Peripherals) 2 as composite machines each having functions of a scanner, a copier, a printer, and the like are connected to a network 3 such as the Internet.

The MFP 2 has a function of data communication performed via the network 3 and can transmit/receive image data and the like to/from the other MFP 2. Further, the MFP 2 has the function of encrypting image data used for data communication and decrypting the encrypted image data.

At the time of transmitting image data via the network 3, the MFP 2 as a transmitter encrypts image data and transmits an encrypted file as a result of the encryption. The MFP 2 as a receiver decrypts the received encrypted file to reproduce the original image data. In the following, a case in which an MFP 2a functions as an image encrypting apparatus and an MFP 2b functions as an image decrypting apparatus will be described. However, the present invention is not limited to that case. There may be a case in which the MFP 2b functions as an image encrypting apparatus and the MFP 2a functions as an image decrypting apparatus.

Although only two MFPs 2 are drawn in FIG. 1, a number of MFPs 2 may be connected to the network 3 and other data communication apparatuses may be also connected. In the case where a number of MFPs 2 are connected to the network 3, each of the MFPs 2 can function as the image encrypting apparatus or image decrypting apparatus.

1-2. Configuration of MFP

Figure 2:
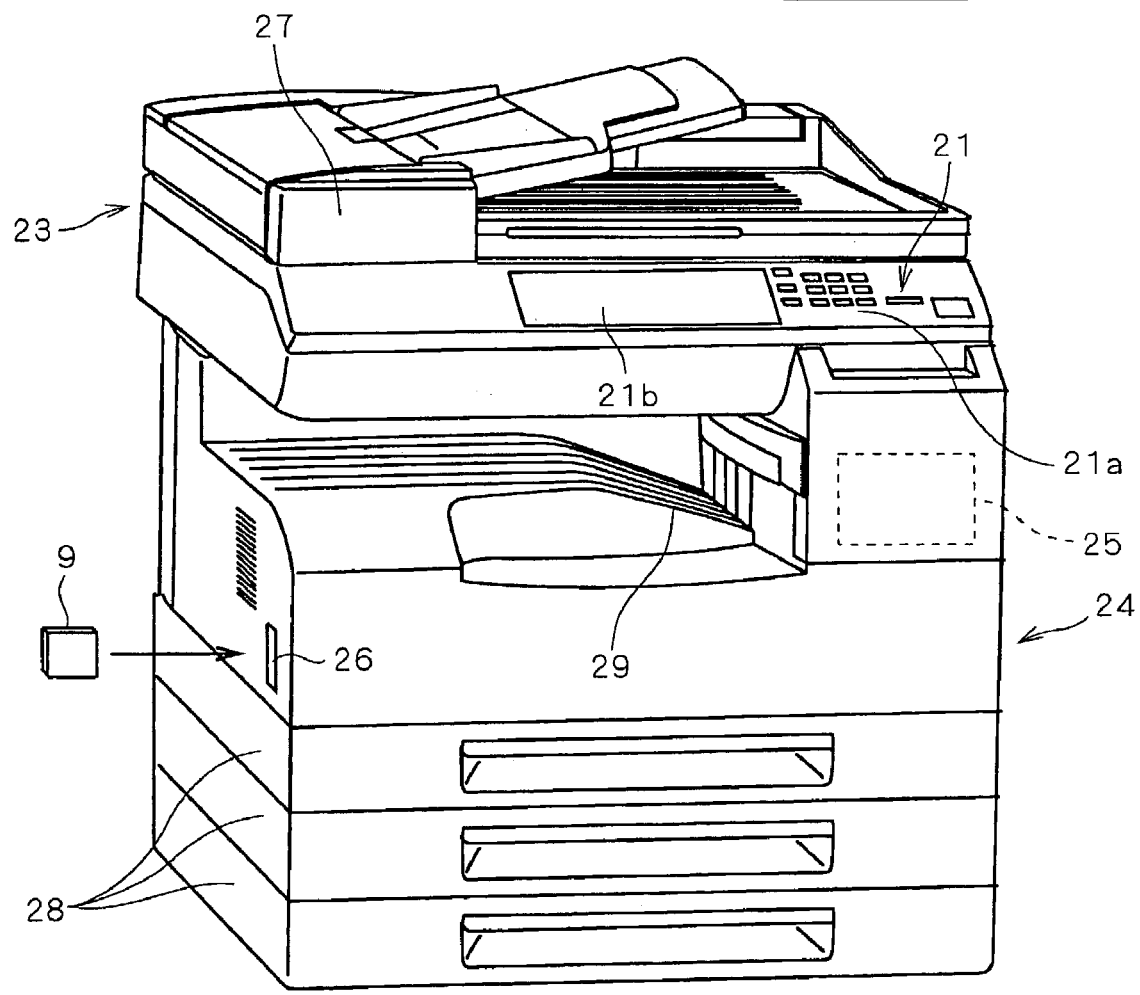
FIG. 2 is a perspective view showing an MFP (image encrypting apparatus or image decrypting apparatus)

FIG. 2 is a perspective view showing the MFP 2 (image encrypting apparatus 2a and image decrypting apparatus 2b). As shown in the drawing, the MFP 2 has, as main components, an operation panel 21 for displaying various information and accepting an operation from the user, a scanner part 23 for photoelectrically reading an original to be captured to thereby obtain image data, and a printer part 24 for printing image data onto a recording sheet.

In the lower part of the body of the MFP 2, a paper tray 28 from which a recording sheet is supplied to the printer part 24 is disposed. In the center part of the body, an ejection tray 29 to which a recording sheet printed by the printer part 24 is ejected is disposed. In the upper part of the body, a top face cover 27 which can be opened and has the function of an original feeder for feeding an original to the scanner part 23 is provided.

Further, in the MFP 2, a data communication part 25 for transmitting/receiving various data via the network 3 and a card I/F 26 into which a memory card 9 as an external recording medium can be inserted are provided. The card I/F 26 writes various data into the memory card 9 and reads data recorded on the memory card 9.

The data communication part 25 has a network I/F and is connected to the network 3 via the network I/F so as to be able to transmit/receive various data to/from external devices. With the configuration, the MFP 2 can transmit image data obtained by the scanner part 23 or the like to external devices via the network 3 and receive image data transmitted from the external devices.

The operation panel 21 has a plurality of operation buttons 21a and a color liquid crystal display 21b. The display 21b has the function of a touch panel so that the user can directly operate on the screen. The user can enter settings of reading of an original, a transmission mode of image data, and the like to the MFP 2 via the operation buttons 21a and the display 21b as a touch panel while checking data displayed on the display 21b.

The MFP 2 has, as image data transmission modes, a normal transmission mode of transmitting image data as it is which is obtained by the scanner part 23 and an encryption transmission mode of transmitting an encrypted file obtained by encrypting image data. One of the transmission modes can be selected via the operation panel 21.

The printer part 24 prints a color image on a recording sheet supplied from the paper tray 28 on the basis of image data obtained by the scanner part 23, image data received via the data communication part 25, and the like.

Figure 3:
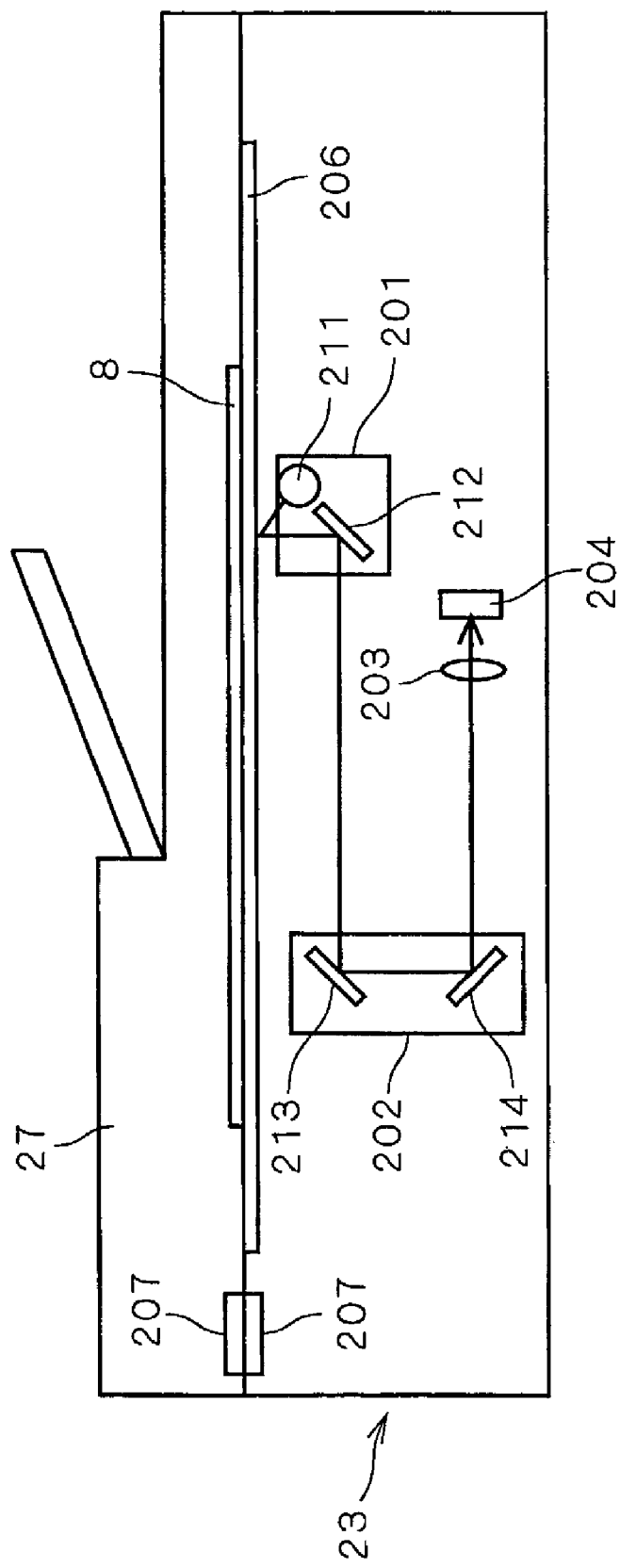
FIG. 3 is a schematic diagram showing the internal configuration of a scanner.

The scanner part 23 photoelectrically reads image information from an original such as a photograph, characters or a picture and generates image data. FIG. 3 is a diagram schematically showing an internal configuration of the scanner part 23.

In the scanner part 23, two carriages (a first carriage 201 and a second carriage 202 ) moving along guide rails (not shown) provided in the horizontal direction are disposed. The first carriage 201 has a built-in light source 211 for illuminating an original 8 placed on a contact glass 206 and a first mirror 212 for reflecting light reflected from the original 8 illuminated with light from the built-in light source 211 in the horizontal direction. On the other hand, the second carriage 202 has a second mirror 213 for reflecting light reflected from the first mirror 212 downward, and a third mirror 214 for further reflecting the reflected light from the second mirror 213 to the horizontal direction.

A lens 203 and a CCD 204 are disposed in proper positions in the lower part of the scanner part 23. The CCD 204 has three line sensors of different read wavelengths. The three line sensors correspond to the colors R, G, and B in a one-to-one corresponding manner. Therefore, the CCD 204 can obtain values of the colors R, G, and B as values of pixels.

At the time of reading the original 8, the first carriage 201 is driven by a stepping motor (not shown) to scan the original face while repeating movement in the horizontal direction of one line and stop. On the other hand, the second carriage 202 is driven so that the optical path length of reflected light from the original face to the CCD 204 becomes constant. In a stop state during the scan, reflection light of one line is received by each of the three line sensors of the CCD 204 and the values of the R, G, an B colors are obtained.

In a closed state, the top face cover 27 is disposed so as to cover the top face of the contact glass 206 of the scanner part 23. It prevents light (fixed light) from outside of the apparatus from entering the scanner part 23 at the time of reading the original 8. Whether the top face cover 27 is in a closed state or opened state is detected by top face cover sensors 207 provided the top face of the top face cover 27 and the top face of the scanner part 23. The top face cover sensors 207 detect the state of the top face cover 27 by detecting whether the sensors contact each other or not.

Figure 4:
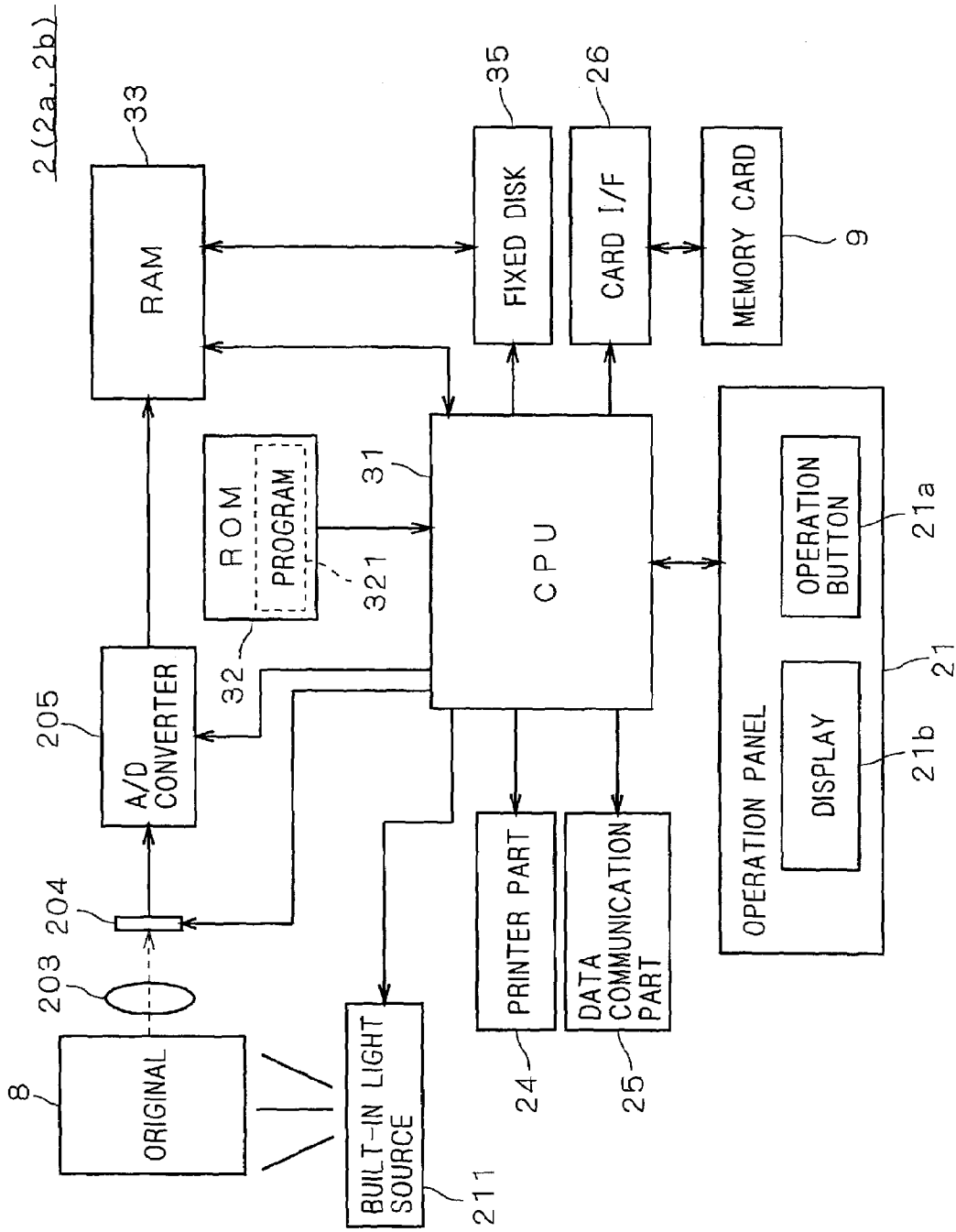
FIG. 4 is a block diagram schematically showing the configuration of the MFP.

FIG. 4 is a block diagram schematically mainly showing the configuration for executing processes according to the preferred embodiment in the configuration of the MFP 2.

In the configuration shown in FIG. 4, the lens 203, the CCD 204, an A/D converter 205, the operation panel 21, a CPU 31, a ROM 32, and a RAM 33 realize the function of obtaining image data. Specifically, when an instruction of reading an original is given from the operation panel 21, an image is formed on the CCD 204 by reflected light from the original by the lens 203, and an image signal from the CCD 204 is converted to a digital signal by the A/D converter 205. The digital image signal obtained by the A/D conversion in the A/D converter 205 is stored as image data in the RAM 33. The operation control is performed by the CPU 31 in accordance with a program 321 stored in the ROM 32. The image data obtained in such a manner is stored properly to a built-in fixed disk 35 or to the memory card 9 by the card I/F 26. As necessary, the image data is printed by the printer part 24 or transmitted to an external MFP 2 or the like connected to the network 3 by the data communication part 25.

The built-in light source 211 in the scanner part 23 and a driving system (not shown in FIG. 4) such as a stepping motor are also connected to the CPU 31 and are controlled by the CPU 31. The top face cover sensor 207 (not shown in FIG. 4) is also connected to the CPU 31 and a signal indicative of passage of current to the top face cover sensor 207 is input to the CPU 31.

The CPU 31, ROM 32, and RAM 33 realize various functions of software. Concretely, the CPU 31 executes computing processes while using the RAM 33 as a work area in accordance with the program 321 stored in the ROM 32, thereby realizing the various functions. The program 321 can be read from the memory card 9 or downloaded from a predetermined server memory device connected to the network 3 via the data communication part 25 and stored into the ROM 32. The MFP 2 functions as the image encrypting apparatus or image decrypting apparatus by the computing processes of the CPU 31 according to the program 321.

1-3. Image Encrypting Apparatus

Figure 5:
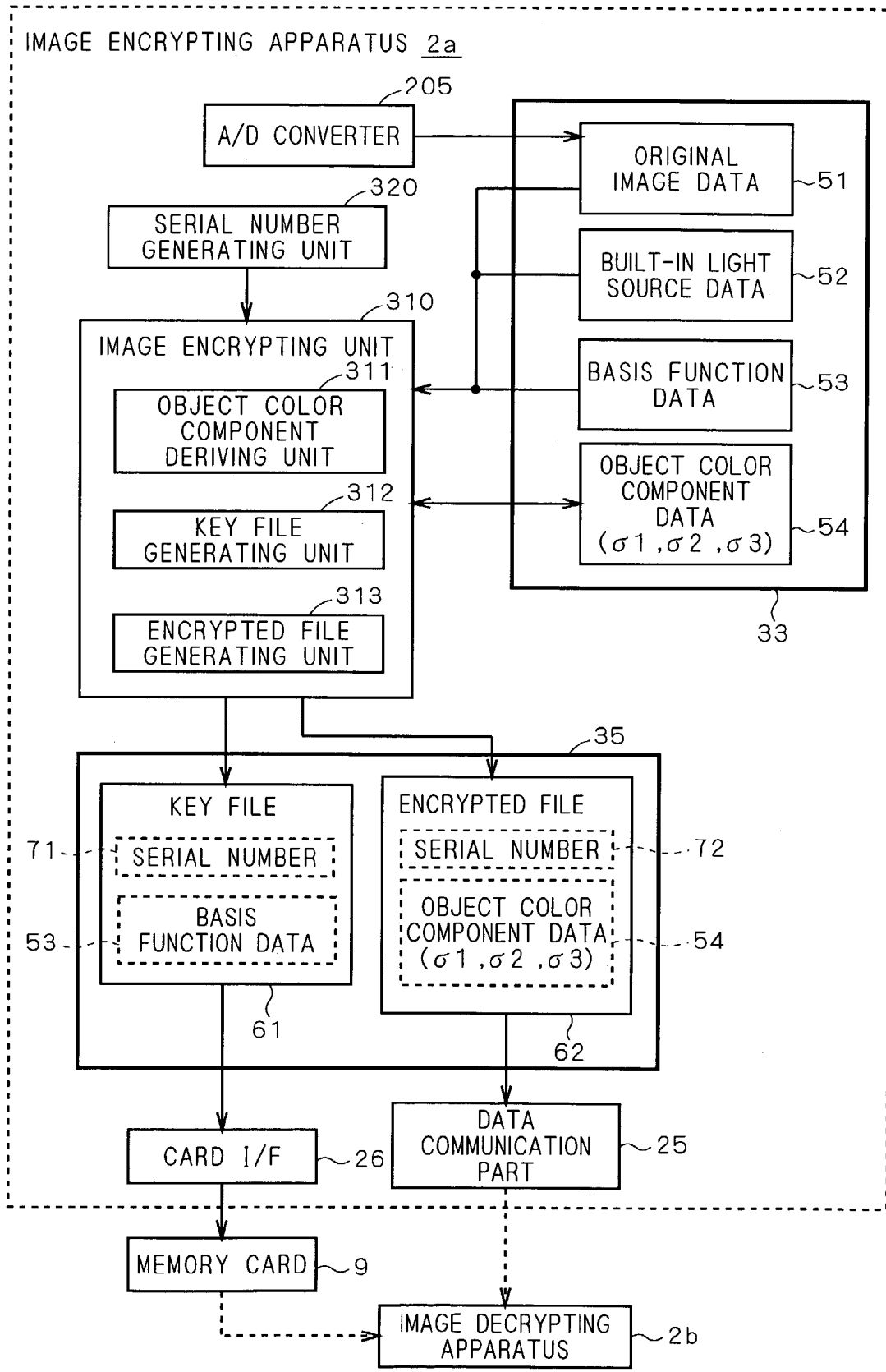
FIG. 5 is a block diagram showing a functional configuration of an image encrypting apparatus according to a first preferred embodiment.

FIG. 5 is a block diagram showing the configuration of functions realized by the CPU 31, ROM 32, and RAM 33 in the image encrypting apparatus 2a together with the other functions. In the configuration shown in FIG. 5, an image encrypting unit 310 and a serial number generating unit 320 are functions realized by the CPU 31 and the like. An object color component deriving unit 311, a key file generating unit 312, and an encrypted file generating unit 313 shown in FIG. 5 are functions of the image encrypting unit 310. The details of the functions will be described in the following.

Figure 6:
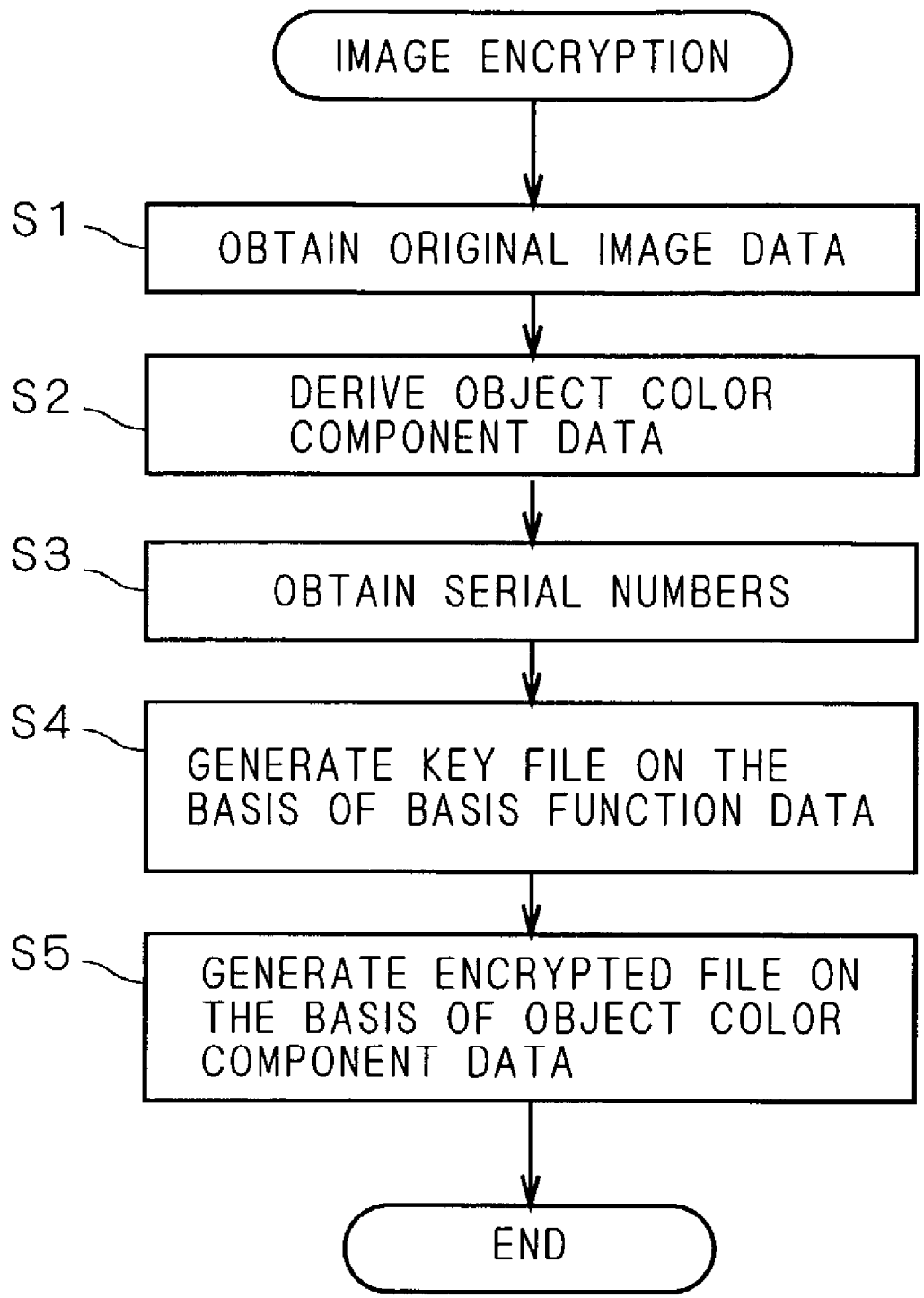
FIG. 6 is a diagram showing the flow of an image encrypting process of the image encrypting apparatus according to the first preferred embodiment.

FIG. 6 is a diagram showing the flow of an image encrypting process for encrypting image data of the image encrypting apparatus 2a set in an encryption transmission mode. With reference to FIGS. 5 and 6, the operation of the image encrypting apparatus 2a will be described.

First, while emitting light from the built-in light source 211, an original is scanned to obtain image data of an original (hereinafter, referred to as "original image data"). Specifically, the face of an original is irradiated with the built-in light source light line by line and light reflected from the irradiated face of the original is received by the CCD 204 via the plurality of minors 212 to 214 and the lens 203. An image signal from the CCD 204 is converted to digital data by the A/D converter 205 and the digital data is transmitted to the RAM 33. The reading operation is performed on the whole face of the original, thereby finally storing original image data 51 into the RAM 33 (step Si). The light emitted from the built-in light source 211 at the time of obtaining the original image is controlled so that its spectral distribution is maintained uniform.

If the top face cover 27 is in an open state at the time of obtaining the original image data 51, fixed light on the outside of the apparatus enters the scanner part 23 and the original image data 51 is influenced by the fixed light. When the original image data 51 is influenced by fixed light, precise computation cannot be performed in the following computation. Consequently, when the top face cover 27 is in an open state before reading of the original, a screen showing an instruction to close the top face cover 27 is displayed on the display 21b. After the top face cover 27 is closed by the user, the original image data 51 is obtained. Therefore, the original image data 51 is obtained as image data derived with illumination light which is only the built-in light source light.

After the original image data 51 is stored in the RAM 33, by the object color component deriving unit 311 of the image encrypting unit 310, pixel values expressed in RGB values of the original image data 51 are converted to tristimulus values (XYZ values) in the XYZ color system by a predetermined matrix computation in which the characteristics of the CCD 204 are considered. Further, by using basis function data 53 including a predetermined basis function, spectral reflectance of the original is obtained from the original image data 51 converted to the XYZ values. The principle of obtaining the spectral reflectance of the original will be described hereinafter.

First, the wavelength of a visible range is set as $\lambda$ and the spectral distribution of illumination light with which the original is illuminated is set as $E(\lambda)$, the spectral distribution $E(\lambda)$ is expressed as follows by using three basis functions $E_1(\lambda)$, $E_2(\lambda)$, and $E_3(\lambda)$ and weighted coefficients $\epsilon_1$, $\epsilon_2$, and $\epsilon_3$.

$$E(\lambda) = \sum_{i=1}^{3} \varepsilon i E i(\lambda) \qquad \text{Equation 1}$$

Similarly, when spectral reflectance in a position on an original corresponding to a pixel (hereinafter, referred to as "target pixel") is set as $S(\lambda)$, the spectral reflectance $S(\lambda)$ is expressed as follows by using three basis functions $S_1(\lambda)$, $S_2(\lambda)$, and $S_3(\lambda)$ and weighted coefficients $\sigma_1$, $\sigma_2$, and $\sigma_3$.

$$S(\lambda) = \sum_{j=1}^{3} \sigma j S j(\lambda) \qquad \text{Equation 2}$$

Therefore, light $I(\lambda)$ entering the target pixel in the CCD 204 is expressed as follows.

$$I(\lambda) = \sum_{i=1}^{3} \varepsilon i E i(\lambda) \cdot \sum_{j=1}^{3} \sigma j S j(\lambda) \qquad \text{Equation 3}$$

When three stimulus values of X, Y, and Z of the target pixel are set as $\rho_X$, $\rho_Y$, and $\rho_Z$ and color matching functions of the XYZ color system are set as $R_X(\lambda)$, $R_Y(\lambda)$, and $R_Z(\lambda)$, $\rho_X$, $\rho_Y$, and $\rho_Z$ are expressed as follows.

$$\rho_X = \int R_X(\lambda) I(\lambda) d\lambda$$

$$\rho_Y = \int R_Y(\lambda) I(\lambda) d\lambda \quad \text{Equation 4}$$

$$\rho_Z = \int R_Z(\lambda) I(\lambda) d\lambda$$

That is, when a stimulus value regarding any of X, Y, and Z of the target pixel (hereinafter, referred to as "target stimulus value") is set as $\rho_C$ and the color matching function corresponding to the target stimulation value is set as $R_C(\lambda)$, the value $\rho_C$ can be expressed as follows.

$$\begin{aligned}\rho_C &= \int R_C(\lambda) I(\lambda) d\lambda \\ &= \int R_C(\lambda) \cdot \sum_{i=1}^{3} \varepsilon i E i(\lambda) \cdot \sum_{j=1}^{3} \sigma j S j(\lambda) d\lambda \\ &= \sum_{i=1}^{3} \sum_{j=1}^{3} \varepsilon i \sigma j \left\{ \int R_C(\lambda) E i(\lambda) S j(\lambda) d\lambda \right\}\end{aligned} \quad \text{Equation 5}$$

In Equation 5, the basis functions $E_i(\lambda)$ and $S_j(\lambda)$ and the color matching function $R_c(\lambda)$ are predetermined functions. Since the original is irradiated with only the built-in light source light of uniform intensity irrespectively of the position on the original, the three weighted coefficients $\epsilon_i$ of the spectral distribution $E(\lambda)$ of the illumination light are values preliminarily obtained by measurement. The information is stored in advance in the ROM 32 and RAM 33. Among the information, the basis function $E_i(\lambda)$ for expressing the spectral distribution $E(\lambda)$ of the illumination light and the weighted coefficient $\epsilon_i$ are stored as built-in light source data 52. The basis function $S_j(\lambda)$ for expressing the spectral reflectance $S(\lambda)$ of the original is stored as the basis function data 53.

Therefore, the unknown values in Equation 5 are only the three weighted coefficients $\sigma_1$, $\sigma_2$, and $\sigma_3$. Equation 5 can be obtained with respect to each of the three stimulus values $\rho_X$, $\rho_Y$, and $\rho_Z$ in the target pixel. By solving the three equations, the three weighted coefficients $\sigma_1$, $\sigma_2$, and $\sigma_3$ can be obtained.

By substituting the three weighted coefficients $\sigma_1$, $\sigma_2$, and $\sigma_3$ and basis function $S_j(\lambda)$ obtained for Equation 2, the spectral reflectance $S(\lambda)$ in the position on the original corresponding to the target pixel can be expressed. Therefore, to obtain the weighted coefficients $\sigma_1$, $\sigma_2$, and $\sigma_3$ substantially corresponds to obtain the spectral reflectance $S(\lambda)$ in the position on the original corresponding to the target pixel.

On the basis of the principle of obtaining the spectral reflectance of an original, the weighted coefficients $\sigma_1$, $\sigma_2$, and $\sigma_3$ in each pixel in the original image data 51 are obtained by the object color component deriving unit 311. The obtained weighted coefficients $\sigma_1$, $\sigma_2$, and $\sigma_3$ of each pixel are stored as object color component data 54 in the RAM 33 (step S2).

After the object color component data 54 is obtained, serial numbers are obtained from the serial number generating unit 320 by the image encrypting unit 310 (step S3). The serial numbers are generated each scan of the original by monitoring the operation of the scanner part 23 by the serial number generating unit 320, so that a serial number is a peculiar number of each scan. That is, a serial number is a number peculiar to the original image data 51.

Subsequently, a key file 61 is generated by the key file generating unit 312 in the image encrypting unit 310. Concretely, a file including a serial number 71 obtained by the serial number generating unit 320 and the basis function data 53 used to derive the object color component data 54 is generated as the key file 61. The generated key file 61 is stored in the fixed disk 35 (step S4).

Subsequently, an encrypted file is generated by the encrypted file generating unit 313 in the image encrypting unit 310. Concretely, a file including a serial number 72 obtained by the serial number generating unit 320 and the obtained object color component data 54 is generated as an encrypted file 62. The generated encrypted file 62 is stored in the fixed disk 35 in a manner similar to the key file 61 (step S5).

In the case of reproducing the original image data 51 from the weighted coefficients $\sigma_1$, $\sigma_2$, and $\sigma_3$ in a manner reverse to the method of obtaining the weighted coefficients $\sigma_1$, $\sigma_2$, and $\sigma_3$ from the original image data 51, first, it is necessary to derive the spectral reflectance $S(\lambda)$ of each pixel. To derive the spectral reflectance $S(\lambda)$ of each pixel, the basis function $S_j(\lambda)$ used at the time of obtaining the weighted coefficients $\sigma_1$, $\sigma_2$, and $\sigma_3$ becomes necessary. That is, to reproduce the original image data 51, the basis function $S_j(\lambda)$ and the three weighted coefficients $\sigma_1$, $\sigma_2$, and $\sigma_3$ of each pixel are necessary. If any of them is missing, it is impossible to reproduce the original image data 51.

Any of the basis function $S_j(\lambda)$ and the three weighted coefficients $\sigma_1$, $\sigma_2$, and $\sigma_3$ is used as key data and a file including the key data is generated. Meanwhile, a file including data except the key data is generated. By managing the files separately, it becomes impossible to reproduce the original image data 51 and, substantially, the original image data 51 can be encrypted.

Consequently, as described above, in the image encrypting apparatus 2a of the preferred embodiment, the basis function $S_j(\lambda)$ is used as key data, the key data is stored as the key file 61 and, on the other hand, the three weighted coefficients $\sigma_1$, $\sigma_2$, and $\sigma_3$ are stored in the encrypted file 62. Thus, the original image data 51 can be encrypted by a relatively easy computation and the original image data 51 can be protected.

At the time of decrypting the encrypted file 62 (which will be described later), to enable only the simultaneously-generated key file 61 to be used, the same number as the serial numbers 71 and 72 peculiar to the original image data 51 is inserted in each of the encrypted file 62 and the key file 61. By referring to the inserted serial numbers, it can be identified that the encrypted file 62 and the key file 61 are simultaneously generated. Therefore, the serial number can be used as identification information so that association between the encrypted file 62 and the key file 61 can be clarified.

The encrypted file 62 generated as described above is transmitted to the image decrypting apparatus 2b designated by the user via the network 3 by the data communication part 25. On the other hand, the key file 61 is stored in the memory card 9 by the card I/F 26 and is separately sent to the manager or the like of the image decrypting apparatus 2b by mail or the like. Each of the encrypted file 62 and the key file 61 cannot reproduce the original image data 51 by itself. By transmitting the files to the image decrypting apparatus 2b by separate methods, even if there is an injustice during transmission of the encrypted file 62, the original image data 51 can be protected and leakage of information can be prevented.

1-4. Image Decrypting Apparatus

The operation of the image decrypting apparatus 2b for reproducing original image data by using the encrypted file 62 and key file 61 generated by the image encrypting apparatus 2a will be described.

Figure 7:
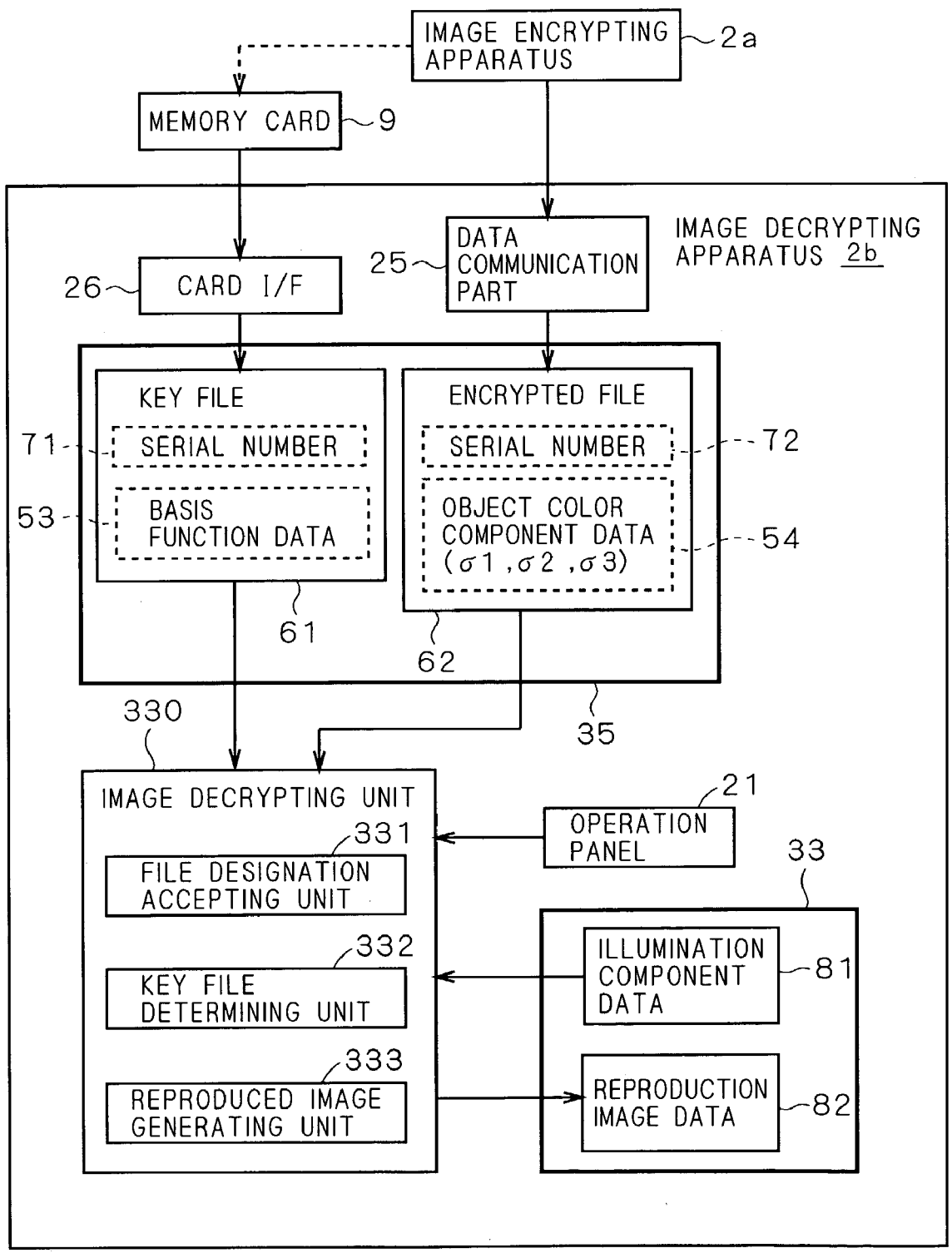
FIG. 7 is a block diagram showing a functional configuration of an image decrypting apparatus according to the first preferred embodiment.

FIG. 7 is a block diagram showing the configuration of functions realized by the CPU 31, ROM 32, and RAM 33 in the image decrypting apparatus 2b together with the other configuration. In the configuration shown in FIG. 7, an image decrypting unit 330 is the function realized by the CPU 31 and the like. A file designation accepting unit 331, a key file determining unit 332, and a reproduced image generating unit 333 shown in FIG. 7 represent the functions of the image decrypting unit 330. The details of the functions will be described below.

As shown in FIG. 7, in the fixed disk 35 of the image decrypting apparatus 2b, the encrypted file 62 received by the data communication part 25 from the image decrypting apparatus 2a via the network 3 and the key file 61 read from the memory card 9 sent by mail or the like by the card I/F 26 are stored. Although one encrypted file 62 and one key file 61 are shown in the diagram for simplification, it is assumed a plurality of encrypted files 62 and a plurality of key files 61 are stored in the fixed disk 35.

Figure 8:
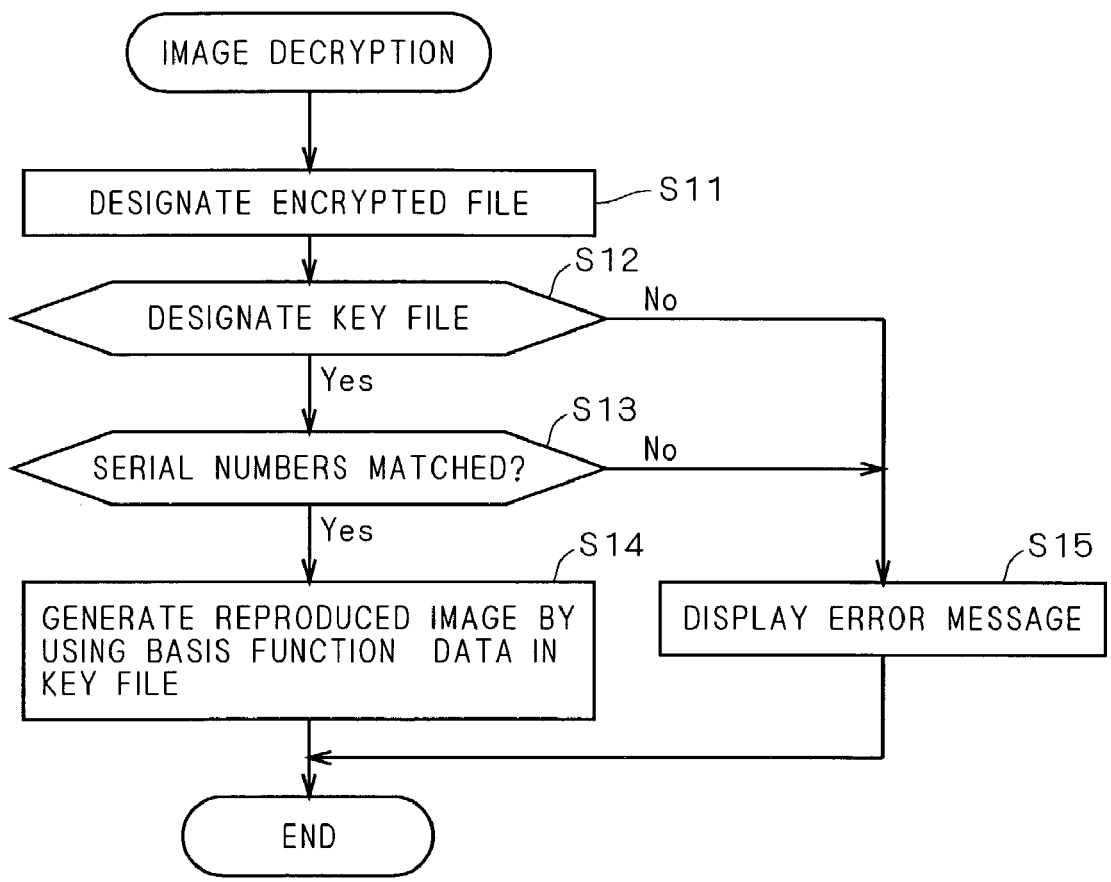
FIG. 8 is a diagram showing the flow of an image decrypting process of the image encrypting apparatus according to the first preferred embodiment.

FIG. 8 is a diagram showing the flow of the image decrypting process for reproducing the original image data by using the encrypted file 62 and key file 61 of the image decrypting apparatus 2b. The operation of the image decrypting apparatus 2b will be described hereinafter with reference to FIGS. 7 and 8.

First, the encrypted file 62 to be decrypted is designated by the user through the operation panel 21. The instruction of designation is accepted by the file designation accepting unit 331, and the designated encrypted file 62 is read to the RAM 33 (step S11).

By the control of the file designation accepting unit 331, a screen for designating the key file 61 used for decryption is displayed on the display 21b of the operation panel 21 (step S12). While referring to the screen, the user designates the key file 61 corresponding to the designated encrypted file 62. If the key file 61 is not designated at this time, the original image data cannot be reproduced in following processes, so that an error message is displayed on the display 21b (step S15), and the process is finished.

On the other hand, when the key file 61 is designated, the instruction of the designation is accepted by the file designation accepting unit 331, and the designated key file 61 is read to the RAM 33. Whether the serial number 72 included in the designated encrypted file 62 and the serial number 71 included in the designated key file 61 coincide with each other or not is determined by the key file determining unit 332 (step S13).

As described above, in the image encrypting apparatus 2a, the same serial number as identification information is inserted in the encrypted file 62 and key file 61 which are simultaneously generated. That is, when the encrypted file 62 and the key file 61 are simultaneously generated, the serial numbers 72 and 71 are supposed to match with each other.

However, in the case where the serial numbers 72 and 71 do not match with each other, the encrypted file 62 and key file 61 are not simultaneously generated, which indicates that the key file 61 may be illegally obtained. In such a case, therefore, an error message is displayed on the display 21b (step S15) and the process is finished as it is.

In the case where the serial numbers as identification information do not match each other, by not performing the process of reproducing the original image data, propriety of the key file 61 can be checked and an illegal key file 61 can be prevented from being used.

On the other hand, if the serial numbers 72 and 71 match with each other, the original image data is reproduced by the reproduced image generating unit 333. Concretely, the basis function data 53 (basis function $Sj(\lambda)$) in the key file 61 is obtained and, further, the object color component data 54 (the weighted coefficients $\sigma_1$, $\sigma_2$, and $\sigma_3$ of each pixel) in the encrypted file 62 is obtained. Computation of Equation 2 is executed on each pixel and the spectral reflectance $S(\lambda)$ in a position on the original corresponding to each pixel is obtained. Further, computation of Equations 3 and 4 is performed and, finally, the tristimulus values $\rho_X$, $\rho_Y$, and $\rho_Z$ (XYZ values) of each pixel are obtained. In such a manner, reproduction image data 82 for reproducing the original image data is generated (step S14).

The color matching functions $R_X(\lambda)$, $R_Y(\lambda)$, and $R_Z(\lambda)$ of the XYZ color system used for computation of Equations 3 and 4, the basis function $E_i(\lambda)$ for expressing the spectral distribution $E(\lambda)$ of illumination light, and the weighted coefficient $\epsilon i$ are preliminarily stored in the ROM 32 and RAM 33. The basis function $E_i(\lambda)$ and the weighted coefficient $\epsilon i$ are stored as illumination component data 81 into the RAM 33 and the like. As the illumination component data 81, it is sufficient to use data indicative of a spectral distribution of the built-in light source light of the image decrypting apparatus 2b or a spectral distribution of a standard light source such as "CIE D 65 light source" and "CIE D 50 light source". To precisely reproduce the original image data, it is preferable to use, as illumination component data 81, a spectral distribution of the built-in light source light of the image encrypting apparatus 2a. Consequently, the built-in light source data 52 of the image encrypting apparatus 2a may be separately sent to the image decrypting apparatus 2b so as to be used as the illumination component data 81 in the image decrypting apparatus 2b. Alternately, the built-in light source data 52 may be included in the key file 61 or encrypted file 62. The illumination component data 81 to be used can be designated by the user.

The reproduction image data 82 generated as described above is stored into the RAM 33 and, after that, displayed on the display 21b and, as necessary, printed on a recording sheet by the printer part 24. The user of the image decrypting apparatus 2b can view the original image data.

In the case where the serial number 71 of the key file 61 is fraudulently rewritten, there is the possibility that use of the fraudulent key file 61 cannot be prevented by a check of propriety of the key file 61 in step S13. However, even in such a case, when the basis function $Sj(\lambda)$ in the key file 61 is not the one used when the encrypted file 62 is generated, it is impossible to generate the normal reproduction image data 82. Therefore, even in the case where the serial number 71 in the key file 61 is fraudulently rewritten, the original image data can be protected.

2. Second Preferred Embodiment

A second preferred embodiment of the present invention will now be described. In the first preferred embodiment, the basis function $Sj(\lambda)$ out of the basis function $Sj(\lambda)$ and the three weighted coefficients $\sigma_1$, $\sigma_2$, and $\sigma_3$ in each pixel necessary to reproduce the original image data is used as key data. In the second preferred embodiment, the weighted coefficient $\sigma_1$ as one of the weighted coefficients $\sigma_1$, $\sigma_2$, and $\sigma_3$ is used as key data.

The network system 1 applied to the second preferred embodiment is similar to that shown in FIG. 1. The configuration of the MFP 2 serving as the image encrypting apparatus 2a or image decrypting apparatus 2b is similar to that shown in FIGS. 2 or 4. In the following, points different from the first preferred embodiment will be mainly described.

2-1. Image Encrypting Apparatus

FIG. 9 is a block diagram showing the configuration of functions realized by the CPU 31, ROM 32, and RAM 33 of the image encrypting apparatus 2a of the preferred embodiment and the other configurations. In the configuration shown in FIG. 9, the image encrypting unit 310, serial number generating unit 320, and an encryption area accepting unit 340 are functions realized by the CPU 31 and the like. In FIG. 9, an alternate data generating unit 314 shown together with the object color component deriving unit 311, key file generating unit 312, and encrypted file generating unit 313 is a function of the image encrypting unit 310.

Figure 10:
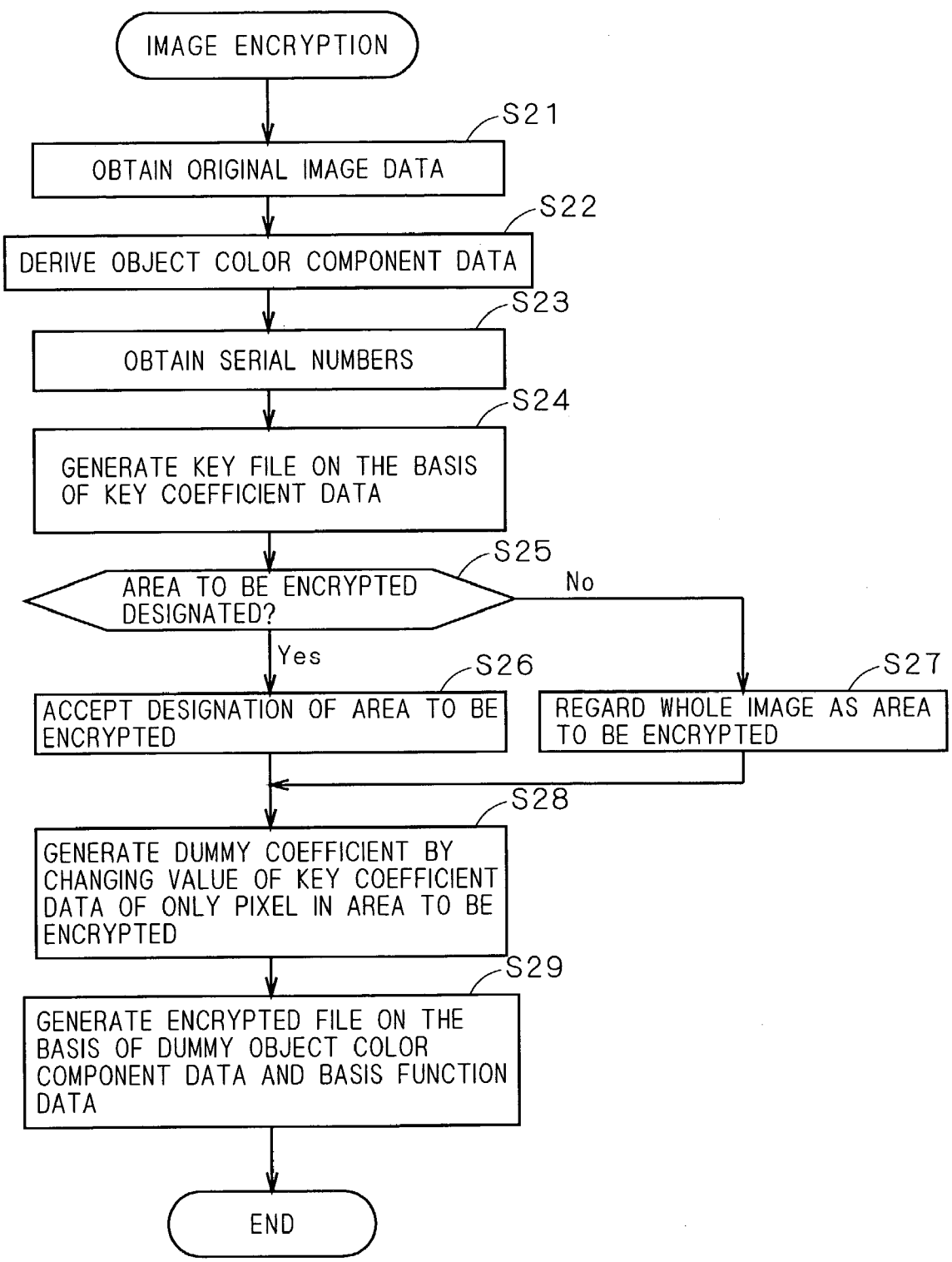
FIG. 10 is a diagram showing the flow of an image encrypting process of the image encrypting apparatus of the second preferred embodiment.

FIG. 10 is a diagram showing the flow of the image encrypting process of the image encrypting apparatus 2a of the preferred embodiment. With reference to FIGS. 9 and 10, the operation of the image encrypting apparatus 2a of the preferred embodiment will be described.

First, in a manner similar to the first preferred embodiment, the original image data 51 is obtained and stored in the RAM 33 (step S21). After that, the object color component data 54 (the weighted coefficients $\sigma_1$, $\sigma_2$, and $\sigma_3$ of each pixel) is obtained on the basis of the basis function data (basis function $Sj(\lambda)$) or the like by the object color component deriving unit 311 (step S22). Serial numbers as identification information are obtained from the serial number generating unit 320 by the image encrypting unit 310 (step S23).

The weighted coefficient $\sigma_1$ as one of the obtained weighted coefficients $\sigma_1$, $\sigma_2$, $\sigma_3$ in each pixel is set as key data (hereinafter, referred to as "key coefficient data"). A file including the key coefficient data 55 and a serial number 71 as obtained is generated as the key file 63 by the key file generating unit 312. The generated key file 63 is stored in the fixed disk 35 (step S24).

Next, a screen for inquiring of whether an area to be encrypted in the original image data 51 is designated or not is displayed on the display 21b by the control of the encryption area accepting unit 340 (step S25). Although the whole area of the original image data 51 is set as an area to be encrypted in the first preferred embodiment, in the second preferred embodiment, an area to be encrypted can be designated by the user.

When it is selected to designate an area to be encrypted, by the control of the encryption area accepting unit 340, a screen for designating an area to be encrypted in the original image data 51 is displayed on the display 21b. FIG. 11 is a diagram showing an example of a screen for designating such an area to be encrypted. The user designates two points on a diagonal line of a desired area 73 as the area to be encrypted while referring to the original image data 51 displayed on the display 21b. By the operation, the designated area 73 is accepted by the encryption area accepting unit 340 and determined as an area to be encrypted. In the example shown in FIG. 11, the area 73 including a flower vase in the original image data 51 is designated as an area to be encrypted (step S26).

On the other hand, when it is selected not to designate an area to be encrypted, the screen shown in FIG. 11 is not displayed and the whole area of the original image data 51 is determined as an area to be encrypted (step S27).

After an area to be encrypted is determined, the value of the weighted coefficient $\sigma_1$ as the key coefficient data 55 in the object color component data 54 (weighted coefficients $\sigma_1$, $\sigma_2$, and $\sigma_3$ in each pixel) is changed by the alternate data generating unit 314 to thereby generate a new weighted coefficient $\sigma_{1d}$. Concretely, by setting the value of the weighted coefficient $\sigma_1$ to a predetermined value or a random value, the weighted coefficient $\sigma_{1d}$ having a value different from the value of the weighted coefficient $\sigma_1$ is generated (step S28).

The weighted coefficient $\sigma_{1d}$ is therefore included in the object color component data in place of the original weighted coefficient $\sigma_1$. In the following, the weighted coefficient $\sigma_{1d}$ will be referred to as a "dummy coefficient" and object color component data including a dummy coefficient will be referred to as "dummy object color component data" 56.

The value of the weighted coefficient $\sigma_1$ is changed only with respect to a pixel corresponding to an area to be encrypted. Therefore, when an area to be encrypted is designated by the user, the original weighted coefficient $\sigma_1$ and the dummy coefficient $\sigma_{1d}$ are different from each other only with respect to a pixel corresponding to the area to be encrypted but coincide with each other with respect to the other pixels.

Subsequently, a file including the serial number 72, dummy object color component data 56, and basis function data 53 is generated as an encryption file 64 by the encrypted file generating unit 313. Therefore, the encryption file 64 is a file including data of the basis function $Sj(\lambda)$ and the three weighted coefficients $\sigma_1$, $\sigma_2$, and $\sigma_3$ necessary for deriving a spectral reflectance $S(\lambda)$ at each pixel, from which data the weighted coefficient $\sigma_1$ as the key coefficient data 55 is excluded, and the dummy coefficient $\sigma_{1d}$. The generated encryption file 64 is stored in the fixed disk 35 in a manner similar to the key file 63 (step S29).

The encryption file 64 and the key file 63 generated are transmitted to the image decrypting apparatus 2b by different methods in a manner similar to the first preferred embodiment.

It is now assumed that the original image data is reproduced from the encryption file 64 generated as described above. Since the encryption file 64 includes the basis function $Sj(\lambda)$ and the three weighted coefficients $\sigma_{1d}$, $\sigma_2$, and $\sigma_3$, by performing computation similar to that performed by the image decrypting apparatus 2b of the first preferred embodiment, some image data can be generated. However, since the dummy coefficient $\sigma_{1d}$ is included as one of the weighted coefficients, it is impossible to normally reproduce the original image data. Therefore, the original image data 51 is substantially encrypted, so that the original image data 51 can be protected.

Figure 12:
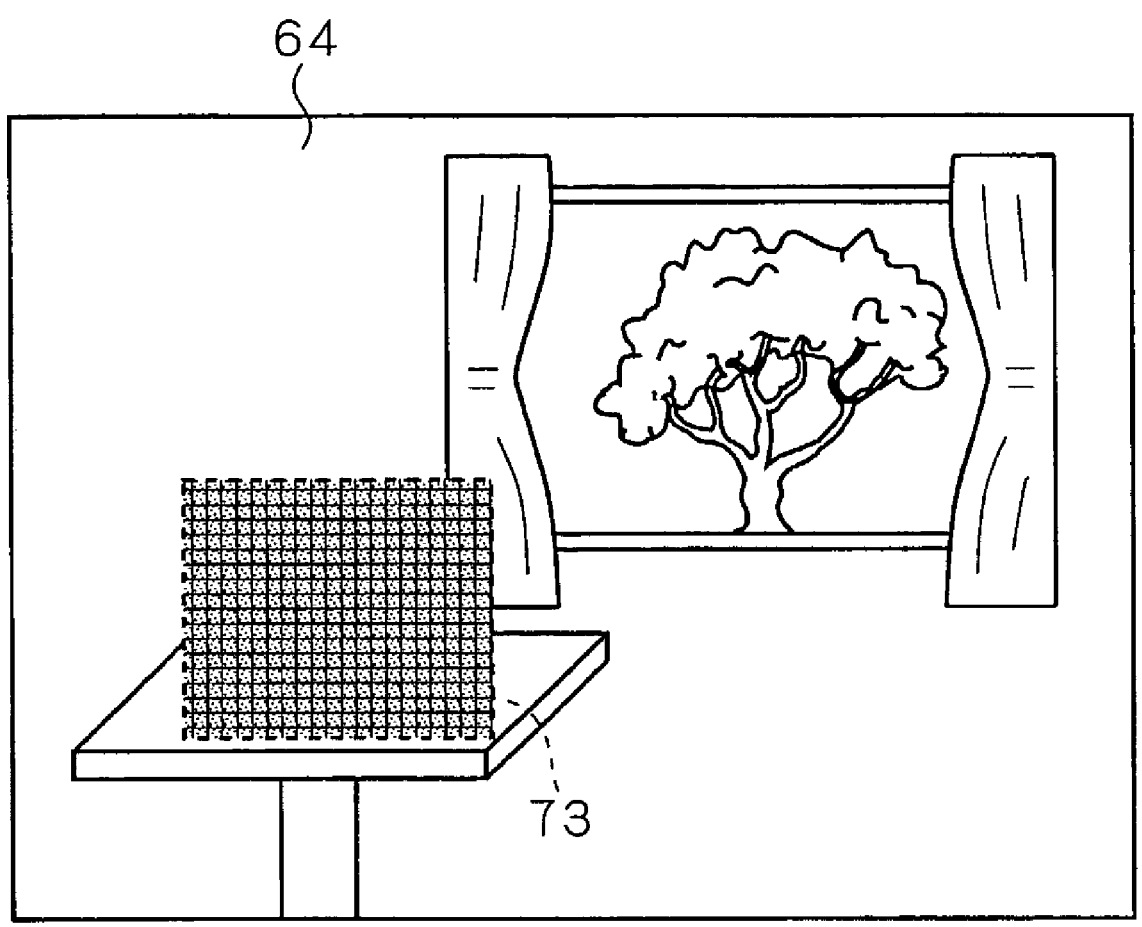
FIG. 12 is a diagram showing an example of an encrypted file in which an area to be encrypted is designated.

In the case where the encryption area is designated, since the value of the dummy coefficient $\sigma_{1d}$ is different from the original weighted coefficient $\sigma_1$ with respect to only the pixels corresponding to the area to be encrypted, only the area to be encrypted is substantially encrypted. FIG. 12 shows the encryption file 64 (accurately, image data generated only from the encryption file 64 generated from the original image data 51 shown in FIG. 11. As shown in the diagram, the area 73 to be encrypted in the encrypted file 64 is in a masked state and the image cannot be known. In the case of designating the encrypted area as described above, only the desired area in the original image data 51 can be efficiently protected. It is effective in a case such that, for example, only the area including important information is desired to be protected.

2-2. Image Decrypting Apparatus

The operation of the image decrypting apparatus 2b for reproducing the original image data by using the encryption file 64 and key file 63 in the image encrypting apparatus 2a will now be described.

Figure 13:
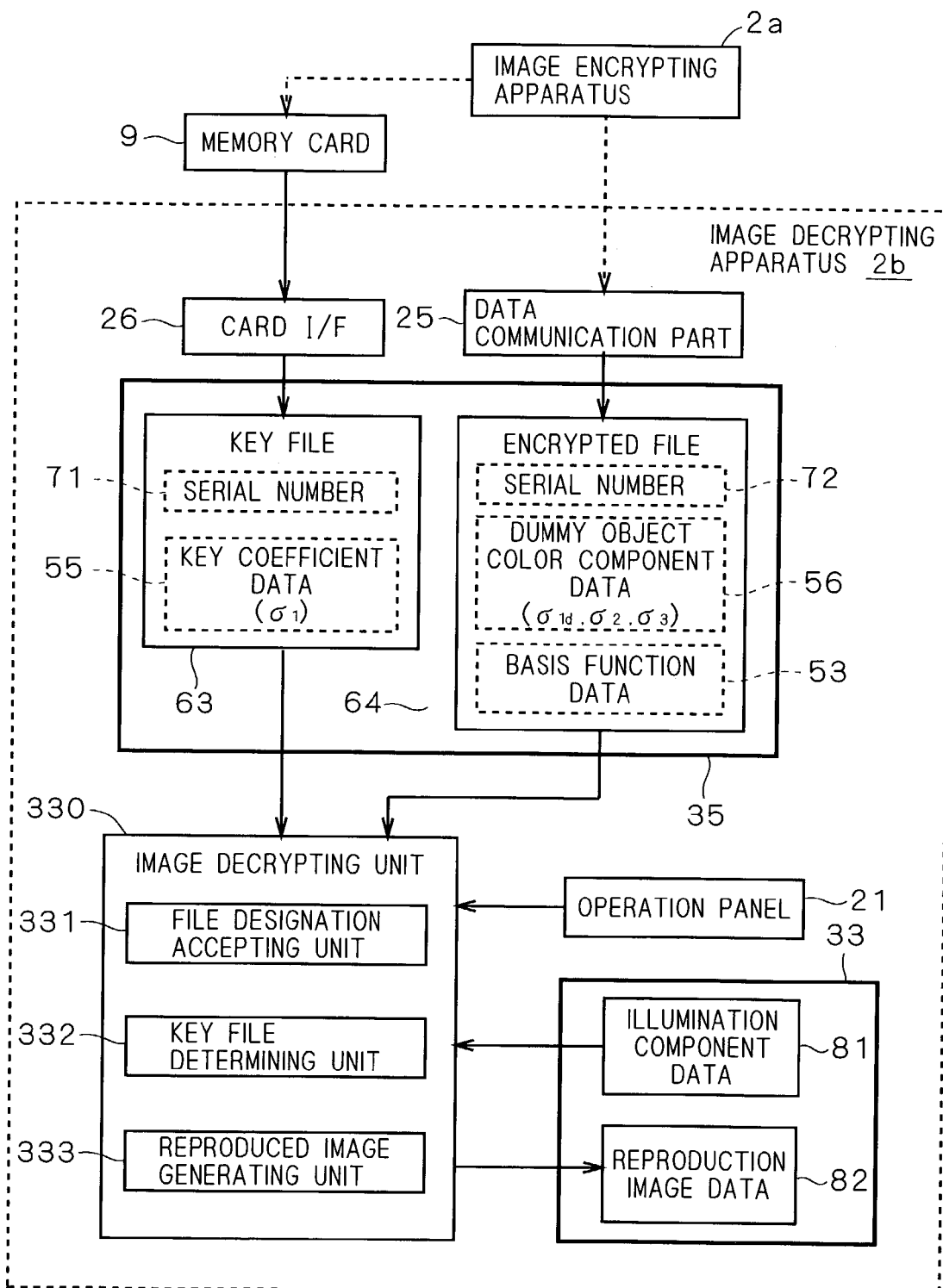
FIG. 13 is a block diagram showing a functional configuration of the image decrypting apparatus according to the second preferred embodiment.

FIG. 13 is a block diagram showing the configuration of functions realized by the CPU 31, ROM 32, and RAM 33 of the image decrypting apparatus 2b of the preferred embodiment together with the other configuration. In a manner similar to the first preferred embodiment, in the fixed disk 35 in the image decrypting apparatus 2b, a plurality of encryption files 64 and a plurality of key files 63 transmitted from the image encrypting apparatus 2a are stored.

Figure 14:
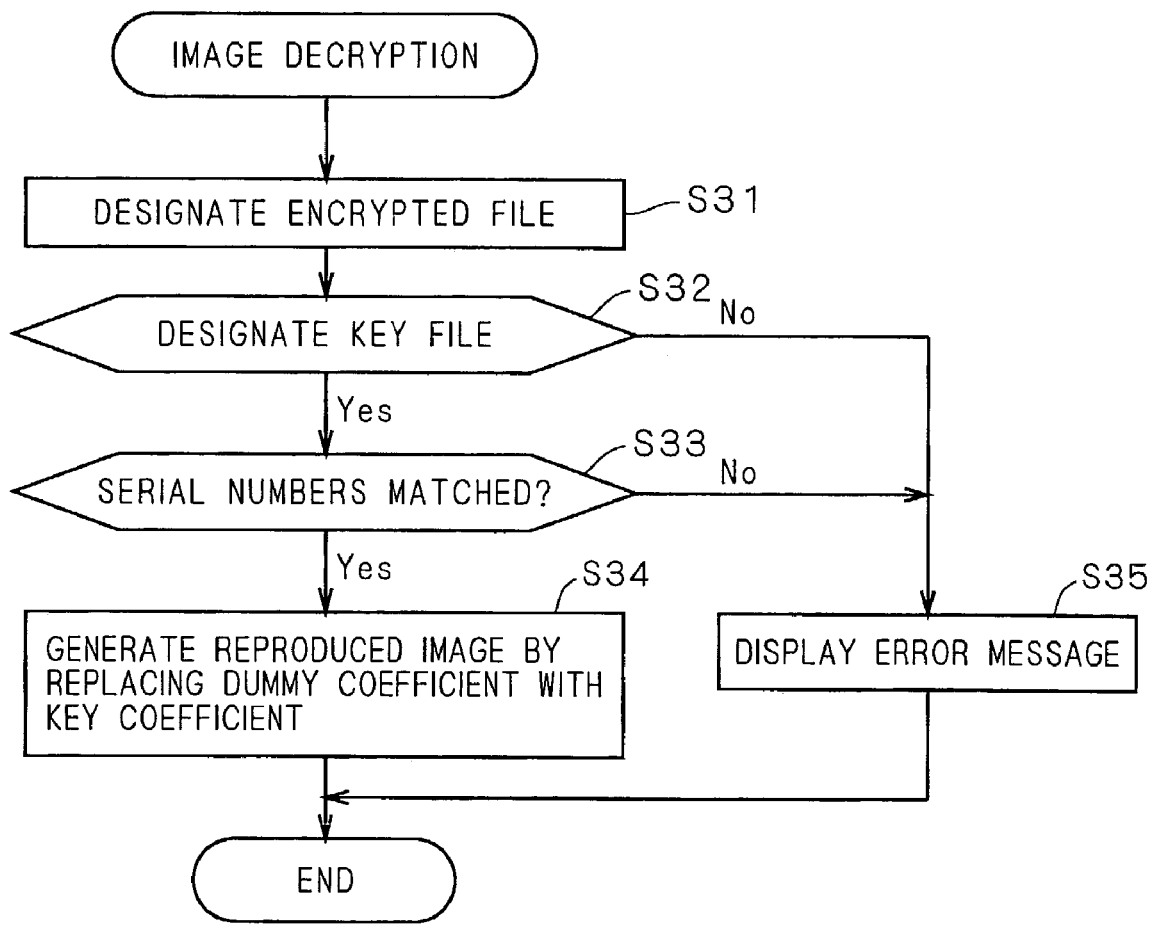
FIG. 14 is a diagram showing the flow of an image decrypting process of the image decrypting apparatus of the second preferred embodiment.

FIG. 14 is a diagram showing the flow of the image decrypting process of the image decrypting apparatus 2b of the preferred embodiment. The operations of the image decrypting apparatus 2b of the preferred embodiment will be described by referring to FIGS. 13 and 14 hereinafter. The operations in steps S31 to S33 in FIG. 14 are similar to those in steps S11 to S13 in FIG. 8.

First, designation of the encryption file 64 is accepted (step S31), designation of the key file 63 is accepted (step S32), and whether serial numbers match with each other or not is determined (step S33). In the processes, when the key file 63 is not designated (No in step S32) or serial numbers do not match (No in step S33), an error message is displayed (step S35), and the process is finished.

When serial numbers match with each other, original image data is reproduced by the reproduced image generating unit 333. Concretely, dummy object color component data 56 (the dummy coefficient $\sigma_{1d}$ and weighted coefficients $\sigma_2$, and $\sigma_3$ of each pixel) and the basis function data 53 (basis function $Sj(\lambda)$) in the encryption file 64 is obtained and further, the key coefficient data 55 (weighted coefficient $\sigma_1$ of each pixel) in the key file 63 is obtained. The dummy coefficient $\sigma_{1d}$ is replaced with the weighted coefficient $\sigma_1$, thereby obtaining the basis function $Sj(\lambda)$ and weighted coefficients $\sigma_1$, $\sigma_2$, and $\sigma_3$ of each pixel necessary to reproduce the original image data. By computation similar to that in the first preferred embodiment, the reproduction image data 82 reproducing the original image data is generated (step S34). Consequently, the user of the image decrypting apparatus 2b can view the original image data.

Figure 15:
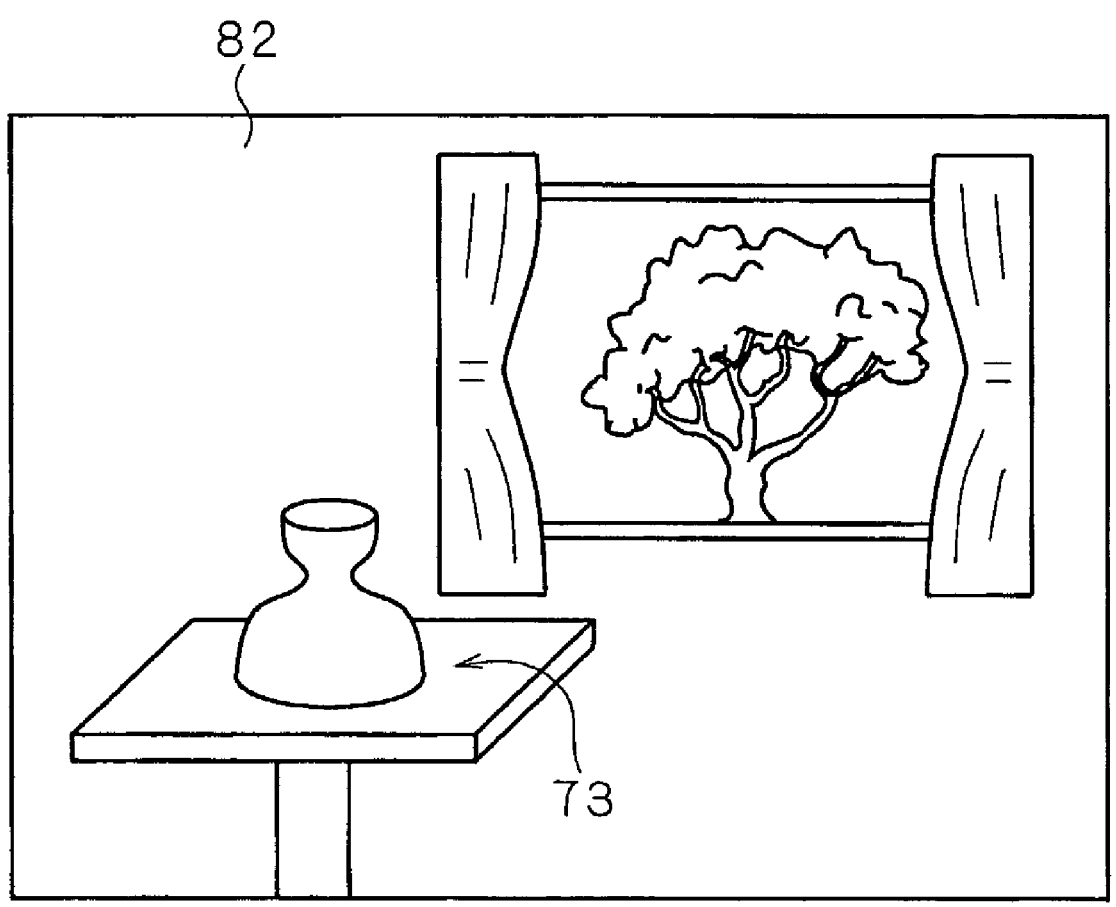
FIG. 15 is a diagram showing an example of reproduction image data.

Even in the case where the encryption area is designated, the reproduction image data 82 is generated by a method similar to the above. FIG. 15 shows the reproduction image data 82 generated by the method from the encrypted file 64 illustrated in FIG. 12. As shown in the diagram, in the reproduction image data 82, the encrypted area 73 is un-masked and all of pixels in the original image data (refer to FIG. 11) are reproduced.

3. Third Preferred Embodiment

A third preferred embodiment of the present invention will now be described. Although original image data is protected in the foregoing preferred embodiments, in the third preferred embodiment, watermark information to form a digital watermark is hidden in an encrypted file and is protected.

The network system 1 applied to the third preferred embodiment is similar to that of FIG. 1. The configuration of the MFP 2 serving as the image encrypting apparatus 2a or image decrypting apparatus 2b is also similar to that shown in FIGS. 2 to 4. Since a key file generated in the third preferred embodiment is similar to that in the second preferred embodiment, points different from the second preferred embodiment will be mainly described hereinafter.

3-1. Image Encrypting Apparatus

FIG. 16 is a block diagram showing the configuration of functions realized by the CPU 31, ROM 32, and RAM 33 of the image encrypting apparatus 2a of the preferred embodiment together with the other configurations. In the configuration of FIG. 16, the image encrypting unit 310, the serial number generating unit 322, and a watermark image accepting unit 350 are functions realized by the CPU 31 and the like.

FIG. 17 is a diagram showing the flow of the image encrypting process of the image encrypting apparatus 2a of the preferred embodiment. The operations of the image encrypting apparatus 2a of the preferred embodiment will be described by referring to FIGS. 16 and 17 hereinafter.

First, in a manner similar to the foregoing preferred embodiments, the original image data 51 is obtained and stored in the RAM 33 (step S41). After that, on the basis of the basis function data 53 (basis function $Sj(\lambda)$) and the like, the object color component data 54 (weighted coefficients $\sigma_1$, $\sigma_2$, and $\sigma_3$ of each pixel) is obtained by the object color component deriving unit 311 (step S42). By the image encrypting unit 310, serial numbers as identification information are obtained from the serial number generating unit 320 (step S43).

The weighted coefficient $\sigma_1$ out of the obtained weighted coefficients $\sigma_1$, $\sigma_2$, and $\sigma_3$ of each pixel is set as the key coefficient data 58. A file including the key coefficient data 58 and the obtained serial numbers 71 is generated as a key file 65 by the key file generating unit 312. The generated key file 65 is stored in the fixed disk 35 (step S44).

Subsequently, by the control of the watermark image accepting unit 350, a screen for accepting watermark information to form a digital watermark is displayed on the display 21b. On the basis of the watermark information input by the user, watermark image data 57 is generated by the watermark image accepting unit 350. For example, a character train desired to be hidden as a digital watermark is input by the operation buttons 21a or the like, and the watermark image data 57 is generated on the basis of the input character train and stored in the RAM 33. The watermark image data 57 is image data in which each pixel is expressed in binary form (1 bit). A bit of a pixel corresponding to the watermark information is set to "1" (step S45).

FIG. 18 is a diagram showing an example of the watermark image data 57. In the example of FIG. 18, the watermark image data 57 generated on the basis of a character train of "Confidential" is shown. In the watermark image data 57 of FIG. 18, bits of pixels corresponding to the character train "Confidential" are set to "1".

Such watermark information is not limited to a character train but may be any information as long as it can be expressed as binary image data such as illustration or symbol. It is also possible to prestore a plurality of pieces of the watermark image data 57 indicative of various watermark information in the fixed disk 35 or the like and select watermark information from the stored data.

After obtaining the watermark image data 57, the value of the weighted coefficient $\sigma_1$ which became the key coefficient data 58 in the object color component data 54 is changed by an alternate data generating unit 314, thereby generating a new weighted coefficient $\sigma_{1w}$ serving as alternate data of the weighted coefficient $\sigma 1$. The weighted coefficient $\sigma_{1w}$ is generated on the basis of the key coefficient data 58 and the watermark image data 57.

Concretely, attention is paid to one pixel in the watermark image data 57 as a target pixel. When "1" is set for the bit of the target pixel, the value of the weighted coefficient $\sigma_1$ of a pixel in the object color component data 54 corresponding to the target pixel is multiplied by a predetermined change rate (for example, a value in a range from 0.9 to 1.1 except 1). By performing such computation on all of pixels, a weighted coefficients $\sigma_{1w}$ slightly different from the value of the weighted coefficient $\sigma_1$ is generated. The value which is actually changed is only of a pixel corresponding to an area of which bit is set to "1" in the watermark image data 57 (step S46).

The new weighted coefficient $\sigma_{1w}$ corresponds to a coefficient obtained by synthesizing and hiding the watermark image data 57 into the weighted coefficient $\sigma_1$. Consequently, in the following, the weighted coefficient $\sigma_{1w}$ will be referred to as a "watermark-synthesized coefficient" and object color component data including the watermark-added coefficient will be referred to as "synthesized object color component data" 59.

Subsequently, a file including the serial number 72, synthesized object color component data 59, and basis function data 53 is generated as an encrypted file 66 by the encrypted file generating unit 313. The encrypted file 66 is a file including the basis function $Sj(\lambda)$, the watermark synthesized coefficient $\sigma_{1w}$ and the weighted coefficients $\sigma_s$ and $\sigma_3$. Watermark information is substantially hidden in the encrypted file 66. The generated encrypted file 66 is stored in the fixed disk 35 in a manner similar to the key file 65 (step S47).

The generated encrypted file 66 and key file 65 are transmitted to the image decrypting apparatus 2b by different methods in a manner similar to the foregoing preferred embodiments.

Assuming now that the original image data is reproduced only from the encrypted file 66 in which the watermark information is hidden by computation similar to that of the image decrypting apparatus 2b of the foregoing preferred embodiment. Since the encryption file 66 includes the basis function $Sj(\lambda)$, the watermark synthesized coefficient $\sigma_{1w}$, and the weighted coefficients $\sigma_2$ and $\sigma_3$, image data can be generated. Since the watermark synthesized coefficient $\sigma_{1w}$ is obtained by slightly changing the original weighted coefficient $\sigma_1$, the change amount is a small change amount which cannot be identified by visual observation of the image data. Consequently, the generated image data is a reproduction of almost the same data as the original image data. On the other hand, it is impossible to visually observe the hidden watermark information, so that the watermark information (watermark image data) is substantially encrypted. Thus, the watermark information can be protected.

3-2. Image Decrypting Apparatus

The operation of the image decrypting apparatus 2b for extracting watermark information from the encrypted file 66 in which the watermark information generated as described above is hidden will now be described.

Figure 19:
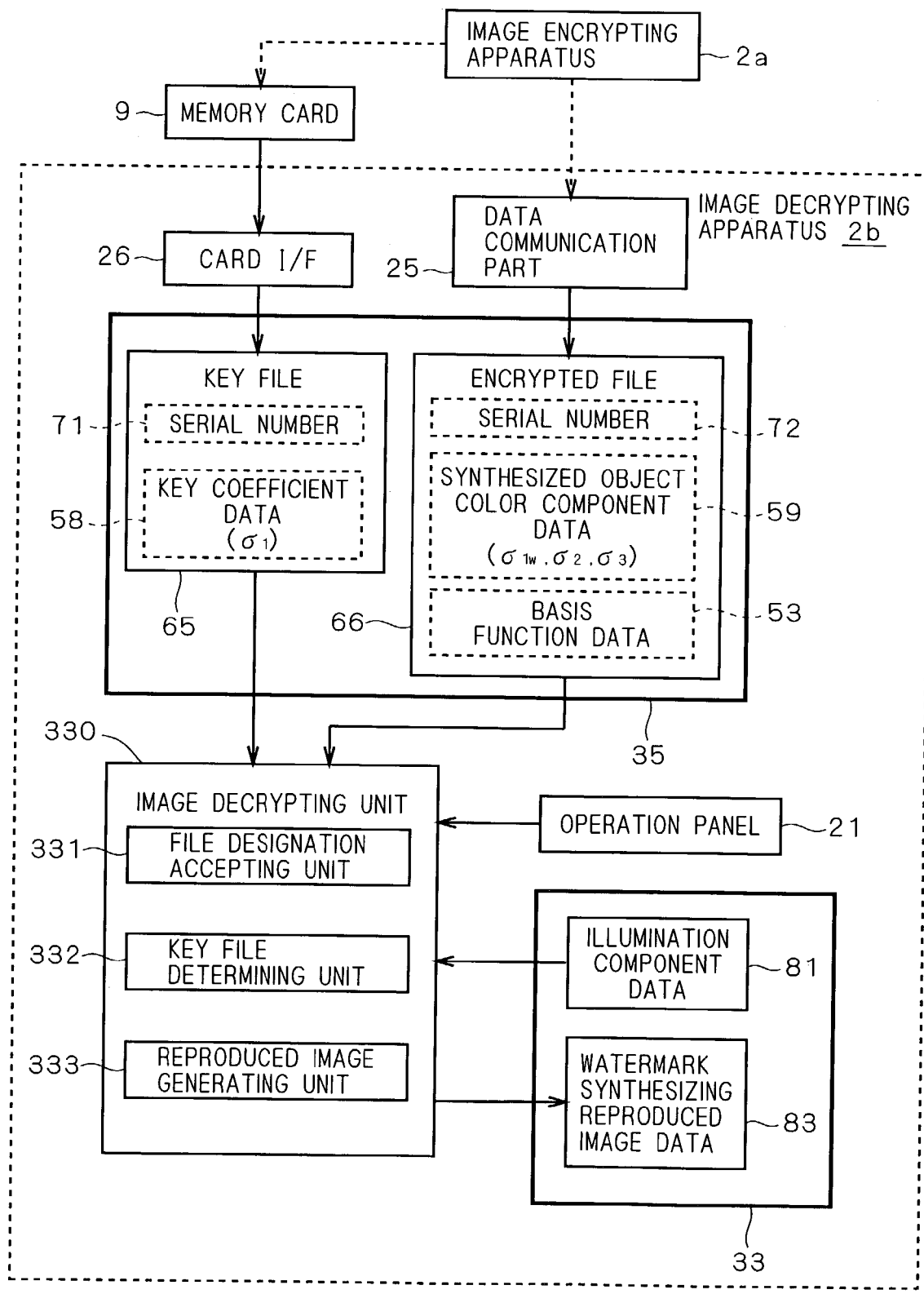
FIG. 19 is a block diagram showing a functional configuration of the image decrypting apparatus of the third preferred embodiment.

FIG. 19 is a block diagram showing the configuration of functions realized by the CPU 31, ROM 32, and RAM 33 of the image decrypting apparatus 2b of the preferred embodiment together with the other configurations. In a manner similar to the foregoing preferred embodiments, a plurality of encrypted files 66 and a plurality of key files 65 transmitted from the image encrypting apparatus 2a are stored in the fixed disk 35 of the image decrypting apparatus 2b.

Figure 20:
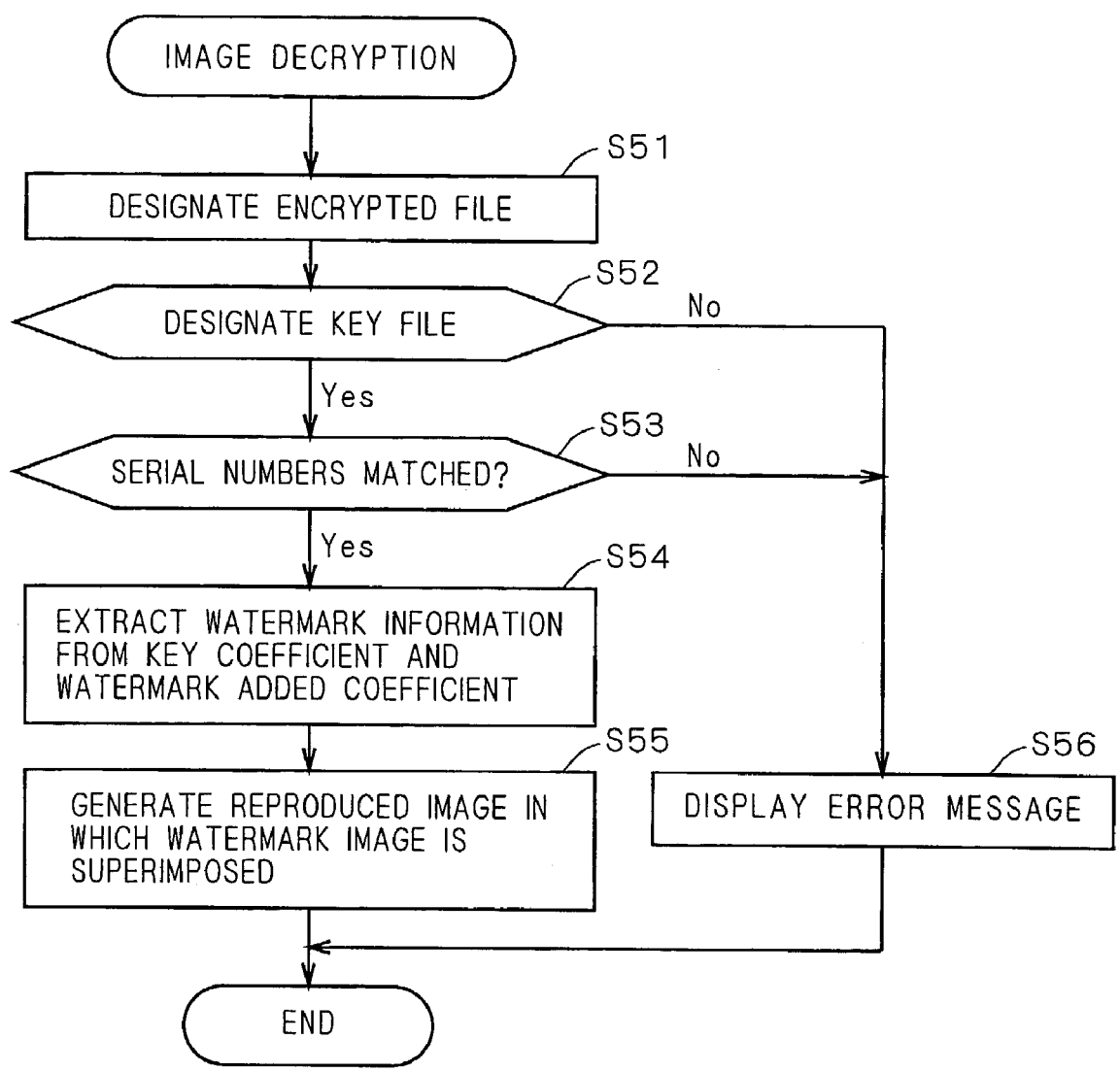
FIG. 20 is a diagram showing the flow of an image decrypting process of the image decrypting apparatus of the third preferred embodiment.

FIG. 20 is a diagram showing the flow of the image decrypting process of the image decrypting apparatus 2b of the preferred embodiment. The operations of the image decrypting apparatus 2b of the preferred embodiment will be described by referring to FIGS. 19 and 20 hereinafter. The operations in steps S51 to S53 in FIG. 20 are similar to those of steps S11 to S13 in FIG. 8.

First, designation of the encryption file 64 is accepted (step S51), designation of the key file 63 is accepted (step S52), and whether serial numbers match with each other or not is determined (step S53). In the processes, when the key file 63 is not designated (No in step S52) or serial numbers do not match (No in step S53), an error message is displayed (step S56), and the process is finished.

When serial numbers match with each other, original image data is reproduced by the reproduced image generating unit 333. Prior to the reproduction, a process of extracting the watermark information hidden in the encrypted file 66 is performed. Concretely, the synthesized object color component data 59 (watermark synthesized coefficient $\sigma_{1w}$ and weighted coefficients $\sigma_2$, and $\sigma_3$ of each pixel) and the basis function data 53 (basis function $Sj(\lambda)$) in the encrypted file 66 is obtained. Further, the key coefficient data 58 (weighted coefficient $\sigma_1$ of each pixel) in the key file 65 is obtained, and the difference between the watermark synthesized coefficient $\sigma_{1w}$ and the weighted coefficient $\sigma_1$ is computed. Only pixels in which the difference occurs in the computation are extracted, and binary image data obtained by setting "1" in the bits of only the extracted pixels is generated.

Since the pixel having the difference between the watermark synthesized coefficient $\sigma_{1w}$ and the weighted coefficient $\sigma_1$ is a pixel in which watermark information is hidden, image data to be generated (hereinafter, referred to as "reproduced watermark image") corresponds to the original watermark image data. That is, the watermark information is extracted by such computation (step S54).

After the watermark information is extracted, by computation similar to the preferred embodiment, reproduction, image data which reproduces the original image data is generated from the basis function $Sj(\lambda)$ and the three weighted coefficients $\sigma_1$, $\sigma_2$, and $\sigma_3$ of each pixel. With respect to a pixel corresponding to a pixel in which "1" is set to the bit in the reproduced watermark image, predetermined XYZ values (predetermined color) are given. In such a manner, watermark synthesized reproduced image data 83 in which the watermark information is superimposed is generated (step S55).

Figure 21:
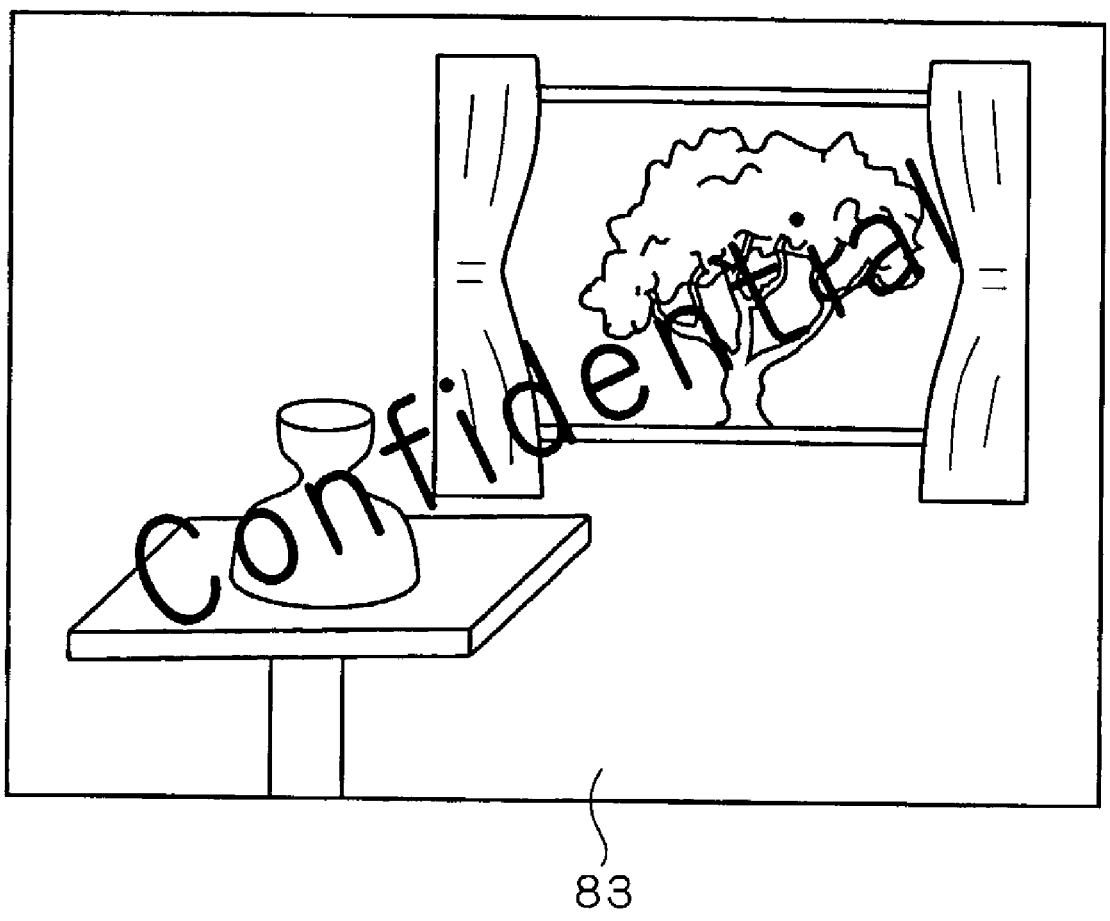
FIG. 21 is a diagram showing an example of watermark synthesized reproduced image data.

FIG. 21 is a diagram showing an example of the watermark synthesized reproduced image data 83 generated from the encrypted file 66 based on the original image data 51 of FIG. 11 and the watermark image data 57 of FIG. 18. As shown in FIG. 21, in the watermark synthesized reproduced image data 83, the character train "Confidential" as watermark information is superimposed. The user of the image decrypting apparatus 2b can therefore view the watermark information.

4. Fourth Preferred Embodiment

A fourth preferred embodiment of the present invention will now be described. In the foregoing preferred embodiments, the image encrypting or decrypting process is performed in the MFP 2. Obviously, the process can be performed by a computer.

FIG. 22 is a diagram showing a schematic configuration of the network system 10 applied to the fourth preferred embodiment. In the network system 10, a plurality of computers 4 are connected to the network 3 such as the Internet. The computers 4 are general computers each having a CPU, a ROM, a RAM, a fixed disk, a display, a communication interface, and the like. The computers 4 can perform communications with each other via the network 3.

An MFP 2c for obtaining original image data is connected to a computer 4a. The configuration of the MFP 2c is similar to that described in the foregoing preferred embodiments except that the image encrypting or decrypting function is not provided.

In the preferred embodiment, original image data obtained by the MFP 2c is transmitted to the computer 4a via a transmission cable 5 or the like, and an encrypted file is generated in the computer 4a. The generated encrypted file is transmitted to a computer 4b via the network 3, and the encrypted file is decrypted by the computer 4b. That is, the computer 4a functions as an image encrypting apparatus and the computer 4b functions as an image decrypting apparatus. The computers 4a and 4b can be used for any of the processes in the first to third preferred embodiments.

For example, in the case of using the computers 4a and 4b shown in FIG. 22 for the processes in the first preferred embodiment, the CPU or the like in the computer 4a performs a computing process in accordance with a program prestored in the fixed disk or the like, thereby functioning as the image encrypting unit 310 shown in FIG. 5. On the other hand, the CPU or the like in the computer 4b performs a computing process in accordance with the program prestored in the fixed disk or the like, thereby functioning as the image decrypting unit 330 shown in FIG. 7.

At the time of performing the image encrypting process, the original image data 51, built-in light source data 52, serial numbers, and the like obtained from the MFP 2c are transferred to the computer 4a, and the computer 4a generates the key file 61 and the encrypted file 62 by using the data. At this time, the basis function data 53 is prestored in the fixed disk or the like of the computer 4a. The generated key file 61 and encrypted file 62 are transmitted to the computer 4b by different methods. On the other hand, at the time of performing the image decrypting process, the computer 4b generates the reproduction image data 82 of the original image data from the data.

In the case of using the computers 4a and 4b shown in FIG. 22 for the process in the second preferred embodiment, the CPU or the like in the computer 4a functions as the image encrypting unit 310 and the encryption area accepting unit 340 shown FIG. 9. On the other hand, the CPU or the like in the computer 4b functions as the image decrypting unit 330 shown in FIG. 13. Similarly, in the case of using the computers 4a and 4b shown in FIG. 22 for the processes in the third preferred embodiment, the CPU or the like in the computer 4a functions as the image encrypting unit 310 and the watermark image accepting unit 350. On the other hand, the CPU or the like in the computer 4b functions as the image decrypting unit 330 shown in FIG. 19.

As described above, the image encrypting process or image decrypting process of the MFP 2 according to the first to third preferred embodiments can be performed by the computer 4. In this case, the general computer 4 can be used as an image encrypting apparatus or image decrypting apparatus.

5. Modifications

In the preferred embodiments, it has been described that the image encrypting apparatus is the MFP 2 or computer 4. For example, a digital camera can be used as the image encrypting apparatus. As a method of obtaining spectral reflectance of a subject from image data, for example, the method disclosed in Japanese Patent Application Laid-Open No. 2001-78202 filed by the applicant herein can be also used.

Although the weighted coefficient $\sigma_1$ is used as key coefficient data in the second preferred embodiment, any of the weighted coefficients $\sigma_1$, $\sigma_2$, and $\sigma_3$ may be used as key coefficient data. Two weighted coefficients out of the weighted coefficients $\sigma_1$, $\sigma_2$, and $\sigma_3$ may be used as key coefficient data. Obviously, in such a case, two dummy coefficients are included in the dummy object color component data.

Although it has been described in the foregoing preferred embodiments that the CPU performs the computing processes in accordance with a program, thereby realizing various functions. Alternately, all or a part of the functions may be realized by a dedicated electric circuit. Particularly, by constructing a part which repeats computation by a logic circuit, high-speed computation is realized.

While the invention has been shown and described in detail, the foregoing description is in all aspects illustrative and not restrictive. It is therefore understood that numerous modifications and variations can be devised without departing from the scope of the invention.

What is claimed is:

1. An image encrypting method comprising:
   deriving a plurality of weighted coefficients from image data of an image to express said image data by a predetermined basis function and said plurality of weighted coefficients;
   setting a portion of said plurality of weighted coefficients as key data and generating a first file including said key data;
   generating a modified plurality of weighted coefficients based on said plurality of weighted coefficients and modified by substituting at least one dummy coefficient for the portion of said plurality of weighted coefficients corresponding to said key data; and
   generating a second file including data of said modified plurality of weighted coefficients;
   wherein both the first file and the second file are necessary to reproduce the image; and
   wherein the first file and the second file are two separate files comprising a common identification number information peculiar to said image.

2. The image encrypting method according to claim 1, wherein
   said key data is a key coefficient as one of said plurality of weighted coefficients, and
   said second file includes alternate data of said key coefficient, which is different from a value of said key coefficient.

3. The image encrypting method according to claim 2, further comprising:
   accepting information to be hidden as a digital watermark in an image, wherein
   said alternate data is generated on the basis of said key coefficient and said information.

4. The image encrypting method according to claim 2, further comprising:
   accepting designation of an area to be encrypted in said image data, wherein
   a value of a pixel only corresponding to said area to be encrypted in said alternate data is different from said value of said key coefficient.

5. The image encrypting method according to claim 1, wherein
   said portion of said plurality of coefficients is set to correspond only to an area of an image to be encrypted.

6. The image encrypting method according to claim 1, further comprising:
   hiding the same serial number for said first and second files.

7. An image decrypting method comprising:
   (a) obtaining key data from a first file, said key data including a portion of a plurality of weighted coefficients for expressing image data;
   (b) obtaining data from a second file, said data including a modified plurality of weighted coefficients, said modified plurality of weighted coefficients based on said plurality of weighted coefficients and modified by substituting at least one dummy coefficient for the portion of said plurality of weighted coefficients corresponding to said key data; and
   (c) reproducing said image data on the basis of said key data obtained from said first file and said data obtained from said second file; and
   wherein the first file and the second file are two separate files comprising a common identification number information peculiar to said image data.

8. The image decrypting method according to claim 7, wherein
said portion of said plurality of coefficients corresponds only to an area of an image to be decrypted.

9. The image decrypting method according to claim 7, wherein
said key data is a key coefficient as one of said plurality of weighted coefficients, and
said second file includes alternate data of said key coefficient, which is different from a value of said key coefficient.

10. The image decrypting method according to claim 7, wherein
said alternate data is generated on the basis of said key coefficient and information to be hidden as a digital watermark in an image, and
(c) includes extracting said information on the basis of said first and second files.

11. The image decrypting method according to claim 7, wherein
when said first and second files are simultaneously generated, said first and second files include the same identification information, and
the image decrypting method further comprises:
determining whether said first file and said second file used for reproducing said image data include the same identification information or not; and
performing (c) only when said first and second files include the same identification information.

12. A computer program product for encrypting, the product comprising:
a computer-readable medium; and
a computer program contained on said computer-readable medium for performing a process comprising:
deriving a plurality of weighted coefficients from image data of an image to express said image data by a predetermined basis function and said plurality of weighted coefficients;
setting a portion of said plurality of weighted coefficients as key data and generating a first file including said key data;
generating a modified plurality of weighted coefficients based on said plurality of weighted coefficients and modified by substituting at least one dummy coefficient for the portion of said plurality of weighted coefficients corresponding to said key data; and
generating a second file including data of said modified plurality of weighted coefficients;
wherein both the first file and the second file are necessary to reproduce the image; and
wherein the first file and the second file are two separate files comprising a common identification number information peculiar to said image.

13. The computer program product according to claim 12, wherein
said key data is a key coefficient as one of said plurality of weighted coefficients, and
said second file includes alternate data of said key coefficient, which is different from a value of said key coefficient.

14. The computer program product according to claim 13, the process further comprising:
accepting information to be hidden as a digital watermark in an image, wherein
said alternate data is generated on the basis of said key coefficient and said information.

15. The computer program product according to claim 13, the process further comprising:
accepting designation of an area to be encrypted in said image data, wherein
a value of a pixel only corresponding to said area to be encrypted in said alternate data is different from said value of said key coefficient.

16. The computer program product according to claim 12, wherein said portion of said plurality of coefficients is set to correspond only to an area of an image to be encrypted.

17. The computer program product according to claim 12, the process further comprising:
hiding the same serial number for said first and second files.

18. A computer program product for decrypting, the product comprising:
a computer-readable medium; and
computer program contained on said computer-readable medium for performing a process comprising
obtaining key data from a first file, said key data including a portion of a plurality of weighted coefficients for expressing image data;
obtaining data from a second file, said data including a modified plurality of weighted coefficients, said modified plurality of weighted coefficients based on said plurality of weighted coefficients and modified by substituting at least one dummy coefficient for the portion of said plurality of weighted coefficients corresponding to said key data; and
reproducing said image data on the basis of said key data obtained from said first file and said data obtained from said second file; and
wherein the first file and the second file are two separate files comprising a common identification number information peculiar to said image data.

19. The computer program product according to claim 18, wherein said portion of said plurality of coefficients corresponds only to an area of an image to be decrypted.

20. An image encrypting apparatus comprising:
a deriving part for deriving a plurality of weighted coefficients from image data to express said image data of an image by a predetermined basis function and said plurality of weighted coefficients;
a first generator for setting a portion of said plurality of weighted coefficients as key data and generating a first file including said key data;
a second generator for generating a modified plurality of weighted coefficients based on said plurality of weighted coefficients and modified by substituting at least one dummy coefficient for the portion of said plurality of weighted coefficients corresponding to said key data; and
a third generator for generating a second file including data of said modified plurality of weighted coefficients;
wherein both the first file and the second file are necessary to reproduce the image; and
wherein the first file and the second file are two separate files comprising a common identification number information peculiar to said image.

21. The image encrypting apparatus according to claim 20, wherein said portion of said plurality of coefficients is set to correspond only to an area of an image to be encrypted.

22. An image decrypting apparatus comprising:
- a first accepting part for accepting a first file including key data, said key data including a portion of a plurality of weighted coefficients for expressing image data;
- a second accepting part for accepting a second file including data, said data including a modified plurality of weighted coefficients, said modified plurality of weighted coefficients based on said plurality of weighted coefficients and modified by substituting at least one dummy coefficient for the portion of said plurality of weighted coefficients corresponding to said key data; and
- a reproducer for reproducing said image data on the basis of said key data obtained from said first file and said data obtained from said second file; and
- wherein the first file and the second file are two separate files comprising a common identification number information peculiar to said image data.

23. The image decrypting apparatus according to claim 22, wherein said portion of said plurality of coefficients corresponds only to an area of an image to be decrypted.

* * * * *